United States Patent [19]
McLean et al.

[11] Patent Number: 5,904,165
[45] Date of Patent: May 18, 1999

[54] HYDRO SERVICE SYSTEM ASSEMBLY

[76] Inventors: Ian McLean, deceased, late of Edmonton; by Raymond Jodoin, executor, c/o 50 Highridge Place, 22051 Township Road 503, Ardrossan, Alberta, both of Canada

[21] Appl. No.: 08/563,485

[22] Filed: Nov. 28, 1995

Related U.S. Application Data

[63] Continuation-in-part of application No. 08/318,873, filed as application No. PCT/CA93/00067, Feb. 18, 1993, abandoned.

[51] Int. Cl.⁶ .................................................. B08B 3/02
[52] U.S. Cl. .................... 134/172; 134/172; 134/181; 134/201; 134/198; 239/171; 244/136
[58] Field of Search .................................. 134/172, 181, 134/198, 201; 239/171; 244/136

[56] References Cited

U.S. PATENT DOCUMENTS

| 3,410,489 | 11/1968 | Waldrum | 239/171 |
|---|---|---|---|
| 3,494,423 | 2/1970 | Stansbury et al. . | |
| 3,523,646 | 8/1970 | Waldrum | 239/171 |
| 3,604,660 | 9/1971 | Marley . | |
| 3,682,418 | 8/1972 | Harter | 244/136 |
| 3,863,736 | 2/1975 | McWilliams . | |
| 3,887,129 | 6/1975 | Brown | 239/551 |
| 3,963,018 | 6/1976 | Barlow | 244/136 |
| 4,055,303 | 10/1977 | Brown | 239/171 |
| 4,477,289 | 10/1984 | Kurtgis | 239/171 |
| 4,589,614 | 5/1986 | Stevens | 239/171 |
| 4,637,575 | 1/1987 | Yenzer . | |
| 4,971,082 | 11/1990 | Kovaletz | 239/171 |
| 4,979,571 | 12/1990 | MacDonald | 244/136 |
| 5,041,164 | 8/1991 | Hingorani | 134/88 |
| 5,106,427 | 4/1992 | Paris | 134/180 |

FOREIGN PATENT DOCUMENTS

| 989374 | 5/1976 | Canada . | |
|---|---|---|---|
| 1248930 | 1/1989 | Canada . | |
| 1294264 | 1/1992 | Canada . | |
| 1306230 | 8/1992 | Canada . | |
| 0-511-910 | 11/1992 | European Pat. Off. . | |
| 694209 | 11/1965 | Italy | 239/171 |
| 2-68297 | 3/1990 | Japan . | |
| 2 261 772 | 5/1993 | United Kingdom . | |

OTHER PUBLICATIONS

"Washing Insulators in the Saudi Arabian Desert," *Transmission & Distribution*, Jan. 1982, pp. 60–62 and 81.
"Helicopter Maintance on Energized EHV Transmission Lines," *Transmission & Distribution*, Nov. 1989, pp. 58–59.
"Insulator Cleaner/Foam Dispenser," *Rotor & Wing International*, Apr. 1990, p. 78.
"FireMaster By Chadwick: Helicopter Mounted Firefighting Equipment for the 80's".
"LACFD Fire–Fighter," *Helicopter World*, Jan.–Mar. 1984.

*Primary Examiner*—Frankie L. Stinson
*Attorney, Agent, or Firm*—Oliff & Berridge, PLC

[57] ABSTRACT

This invention is directed to a multipurpose repair and maintenance apparatus for aerial inspection, repair and cleaning, comprising a work platform for installation on the skids of an helicopter and sustaining a boom assembly and a fluid circuit such that the loads on the work platform are fully balanced. The work platform is made of electrically conductive material and all electrically conductive parts of the apparatus are connected to the electrically conductive parts of the helicopter to have same electrical potential. The boom assembly extends from the port side of the work platform and has an inboard section and an outboard section. A pumping assembly is mounted on a power drive mount at the starboard side of the platform, so as to balance the weight of the boom assembly. A boom actuator is provided at the onboard end of the boom assembly and controls the vertical and horizontal movement of the outboard end. The fluid circuit includes the pumping assembly and fluid conduits guided along the boom assembly for spraying cleaning fluid from a fluid storage tank through a nozzle located at the outboard end of the boom assembly. The orientation of the nozzle is controlled with a nozzle control arm. When the work platform is used for inspection or repair, the boom assembly is removed and a wing is attached to the portside. Now, the weight of the inspector/repairman at the portside is balanced by the weight of the power drive mount at the starboard side. In addition, the length of the starboard side of the work platform and the port side is also selected so that the loads are balanced.

45 Claims, 16 Drawing Sheets

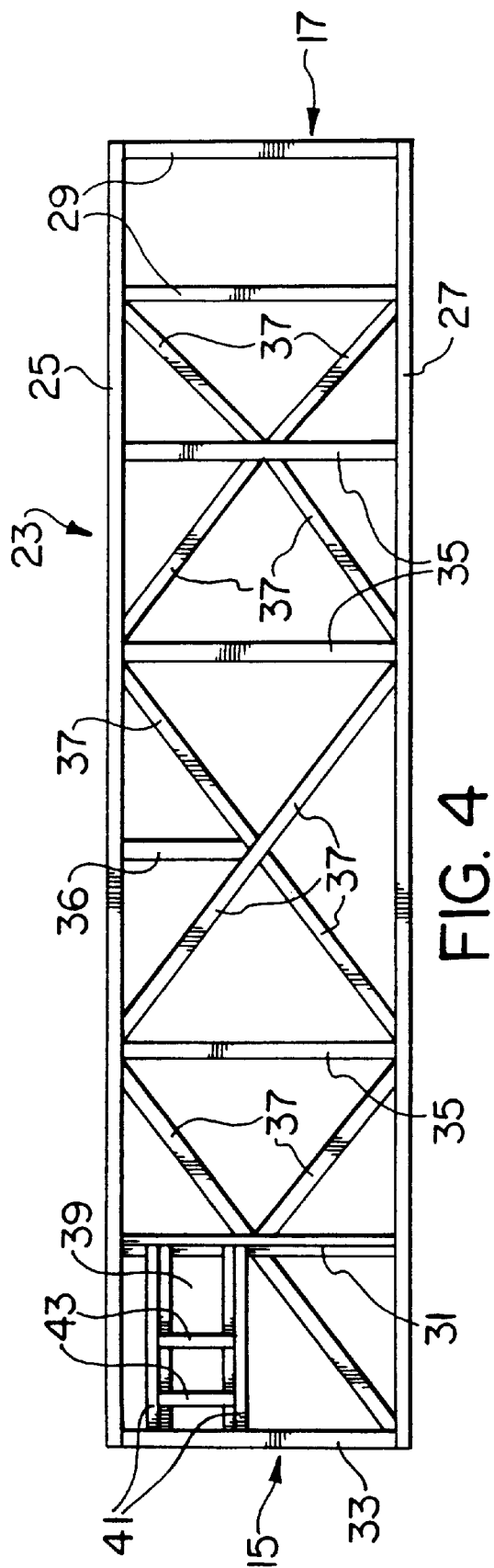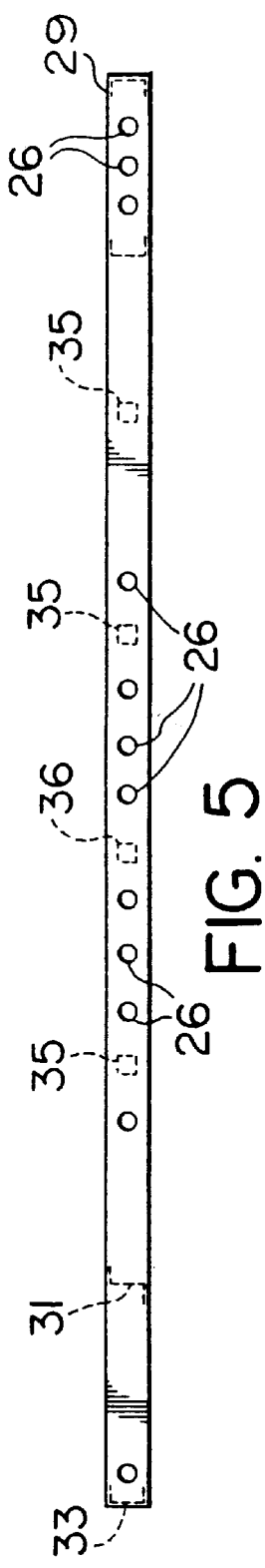

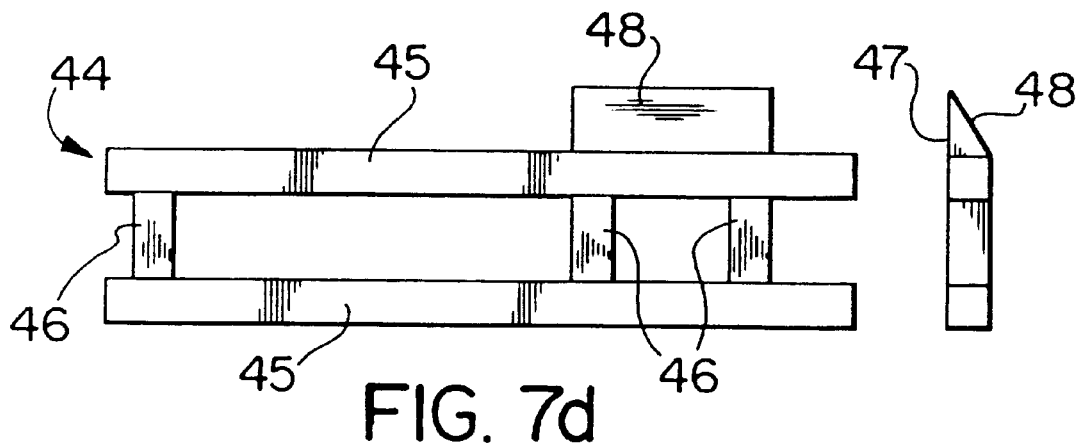
FIG. 7d
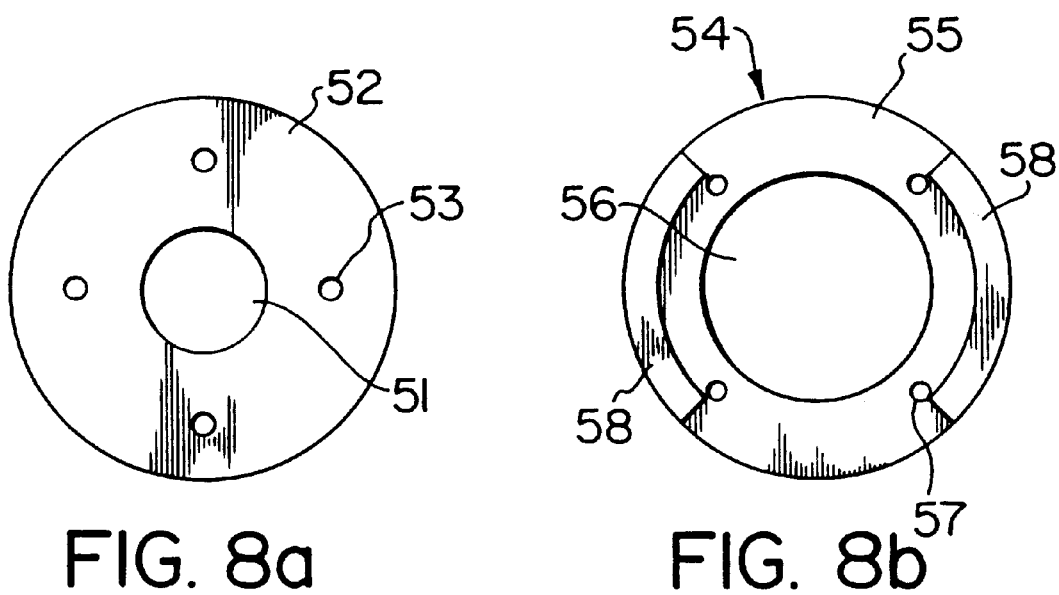
FIG. 8a
FIG. 8b
FIG. 8c

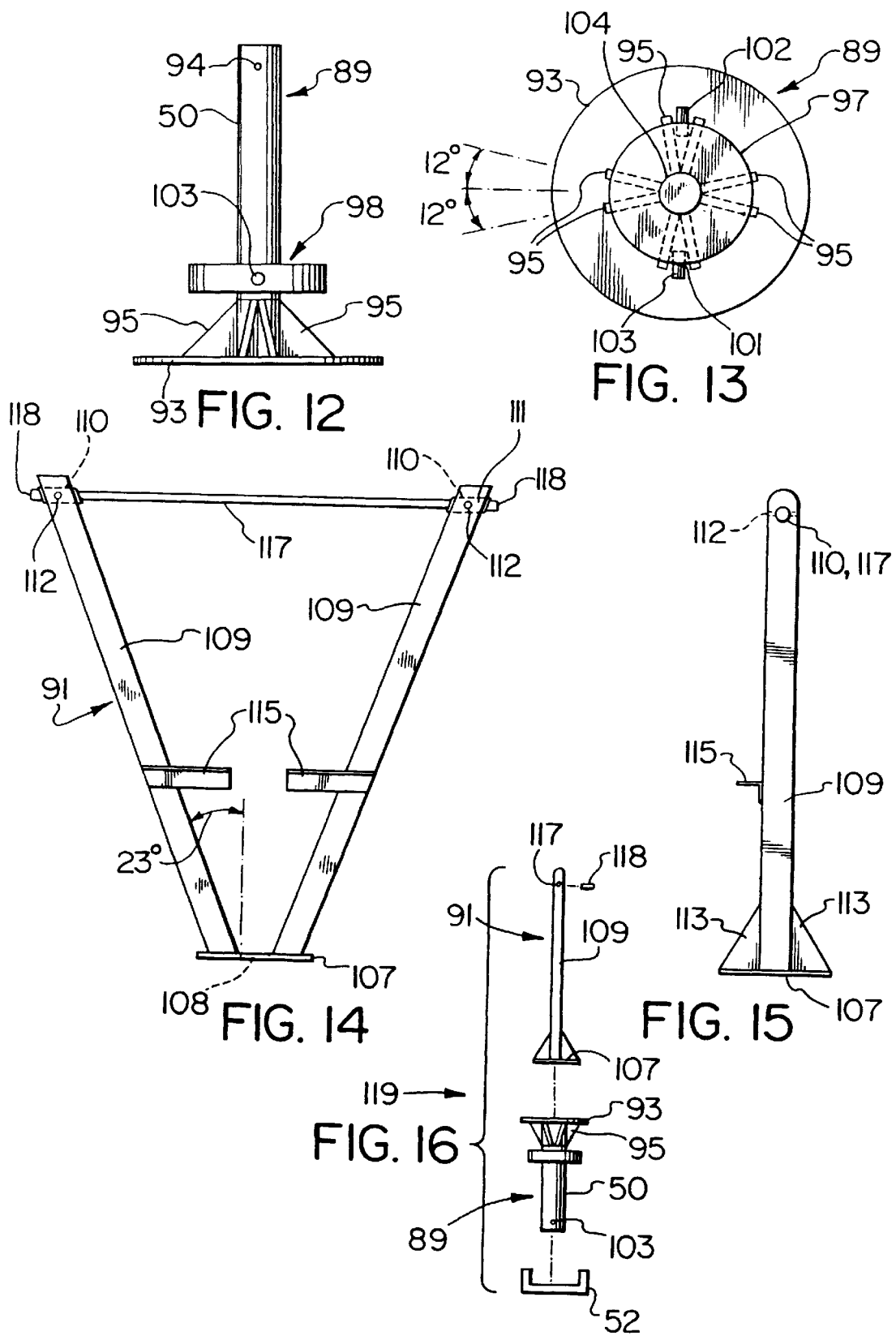

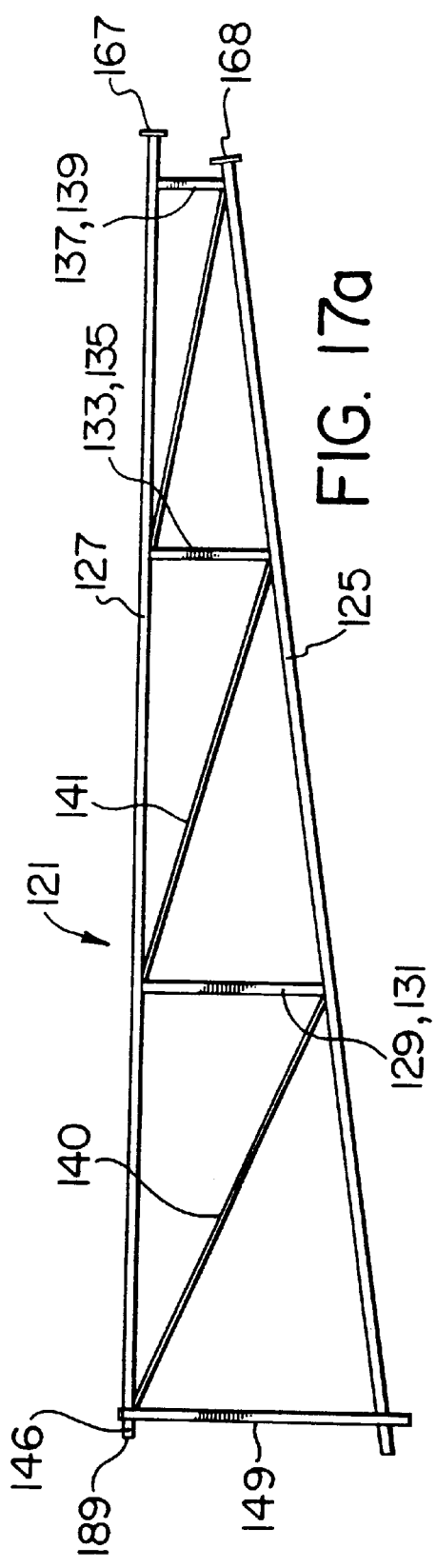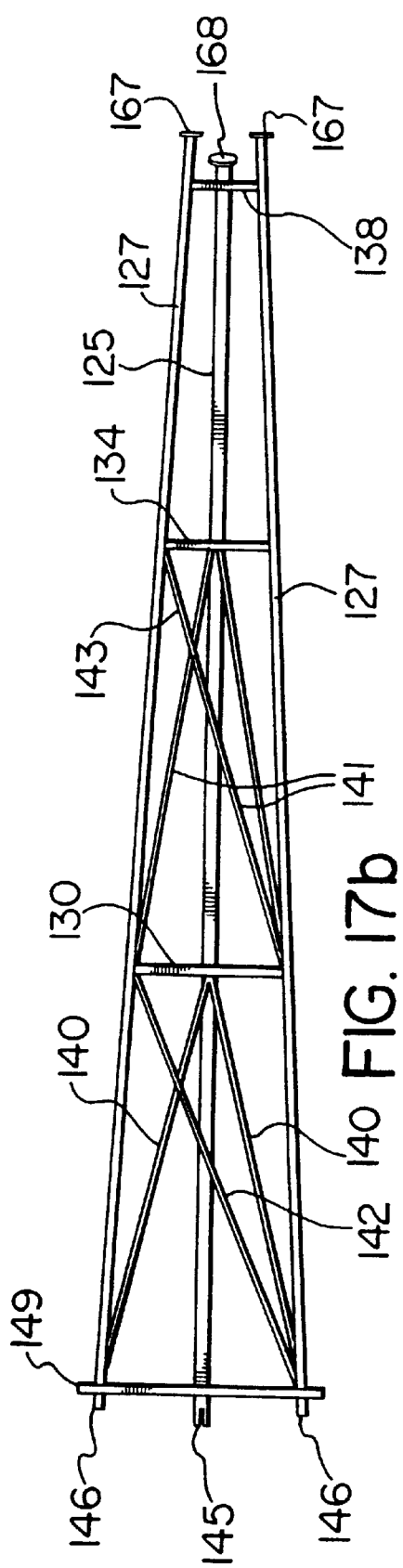

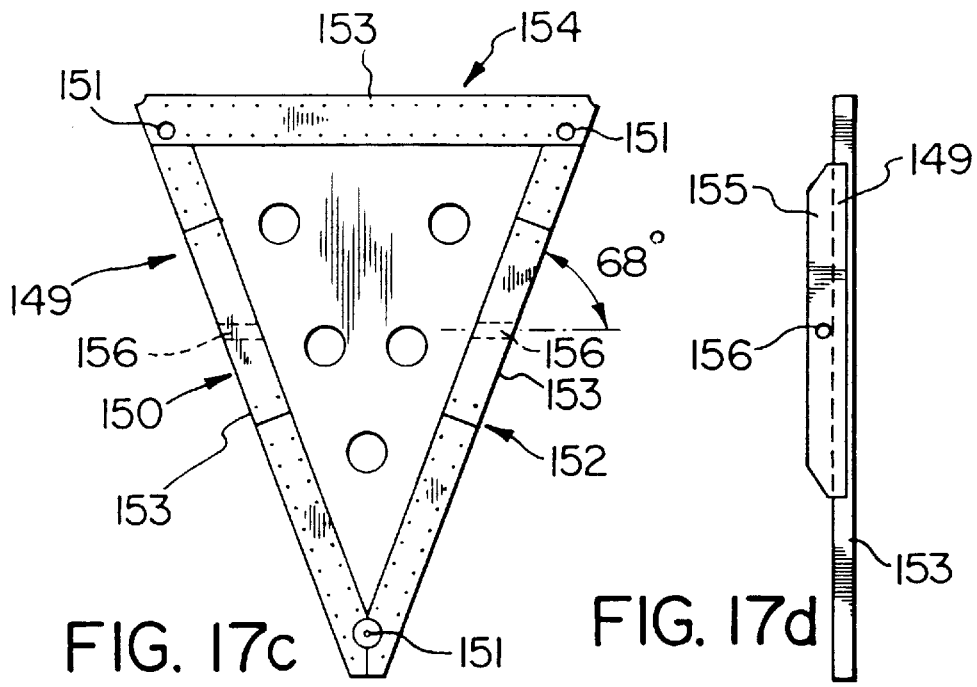
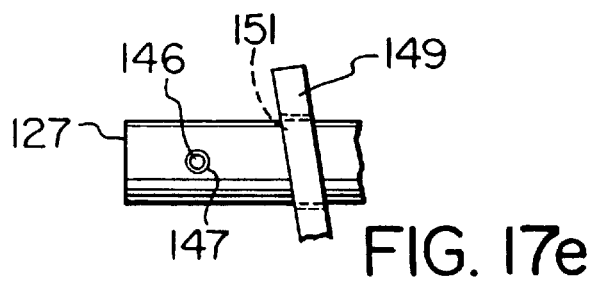
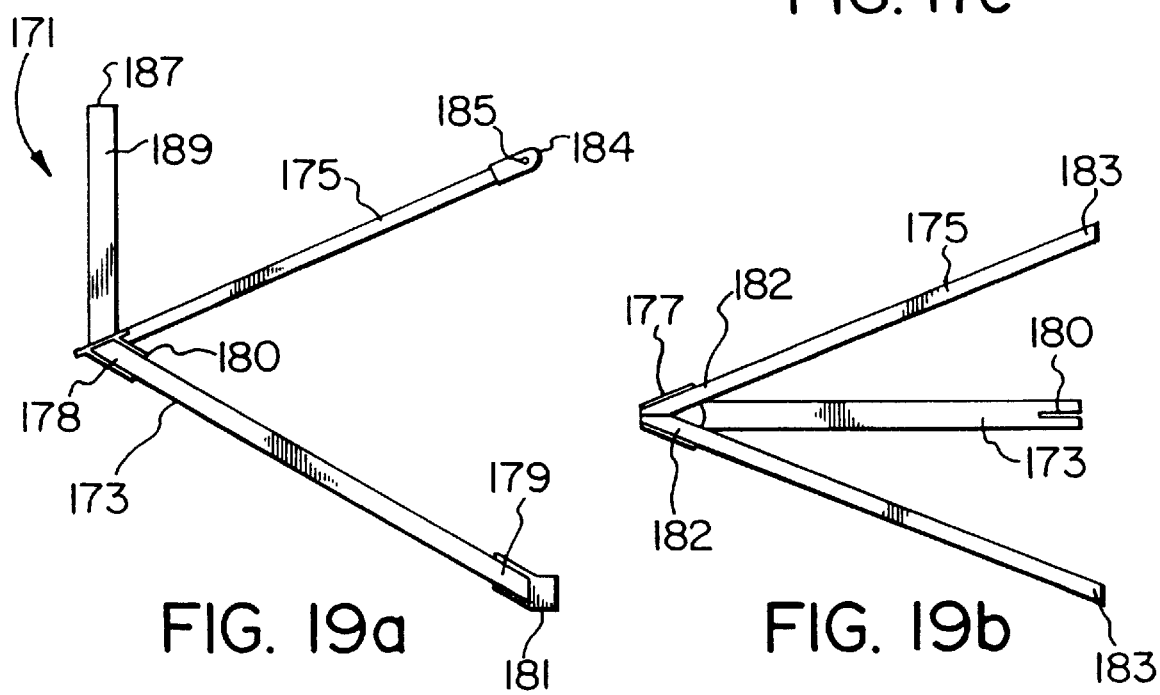

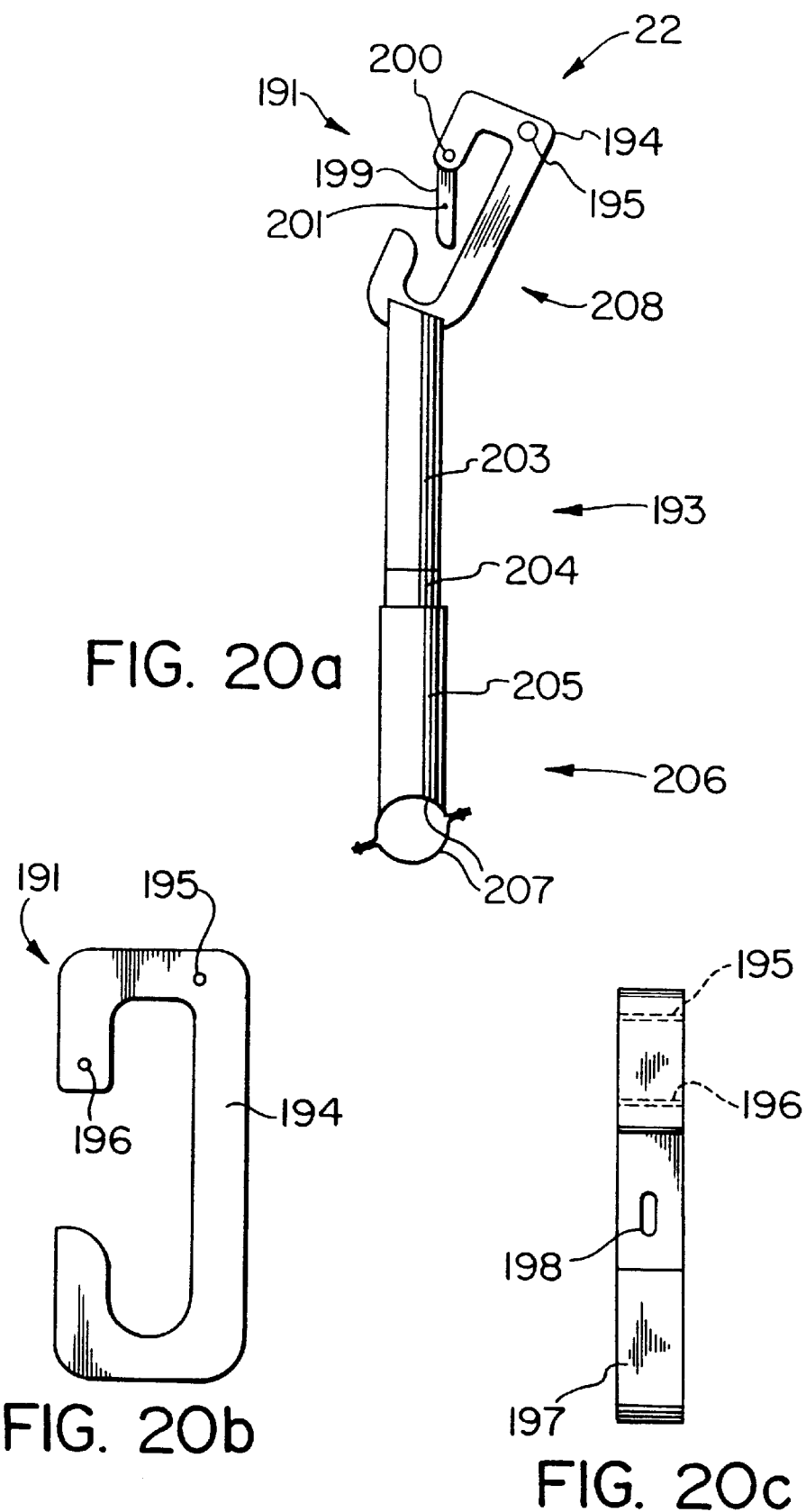

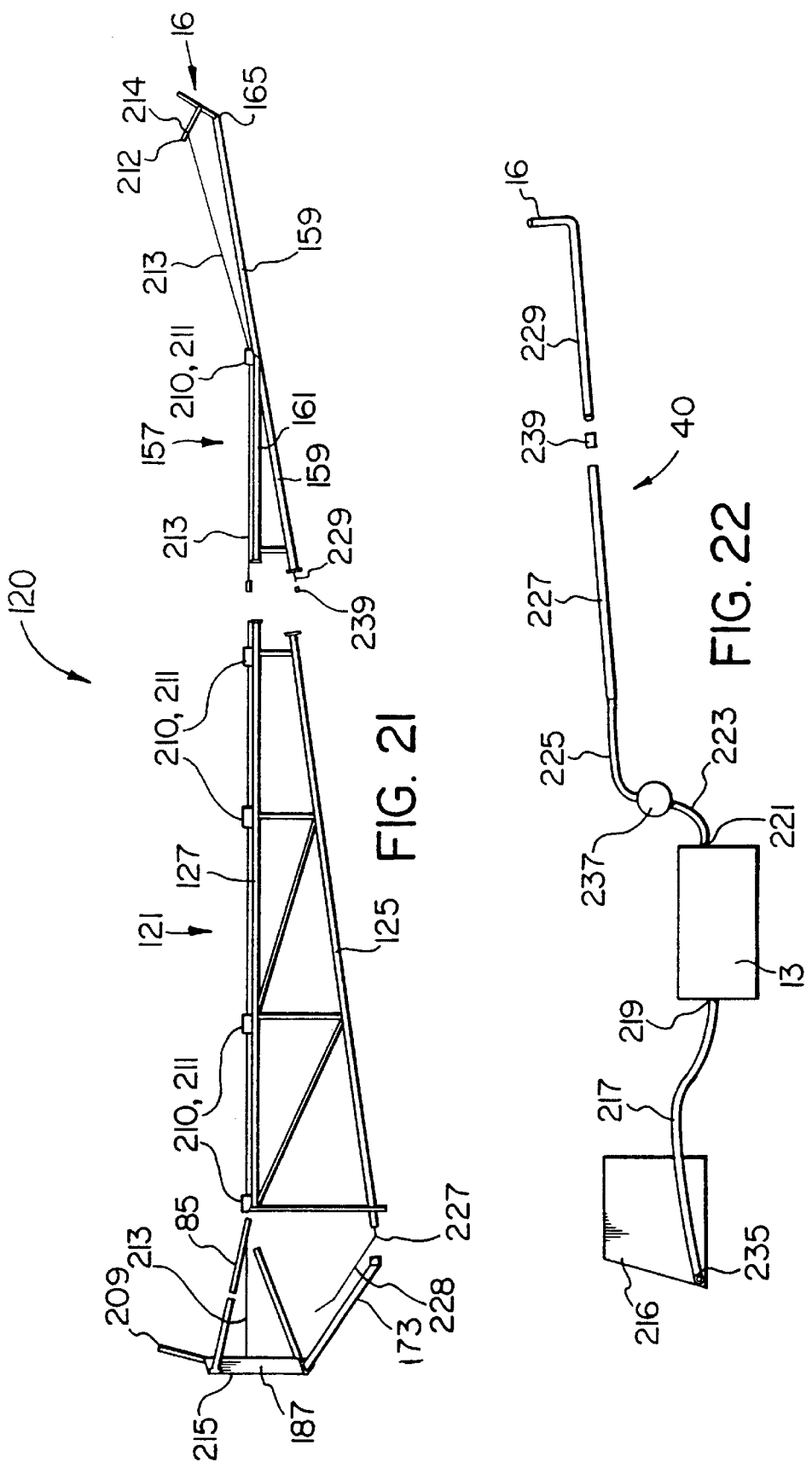

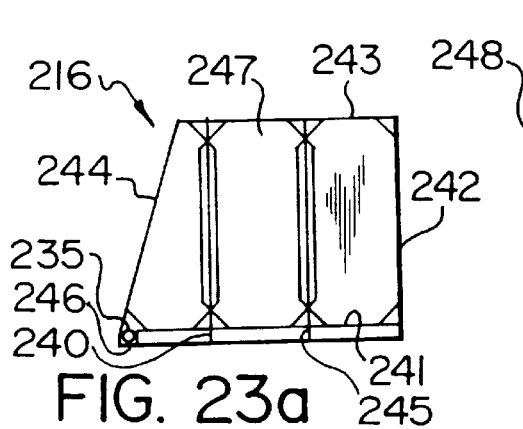
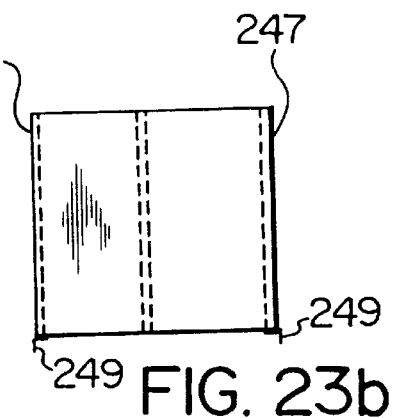
FIG. 23a   FIG. 23b
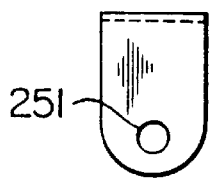
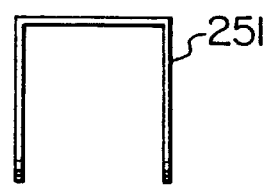
FIG. 23c   FIG. 23d
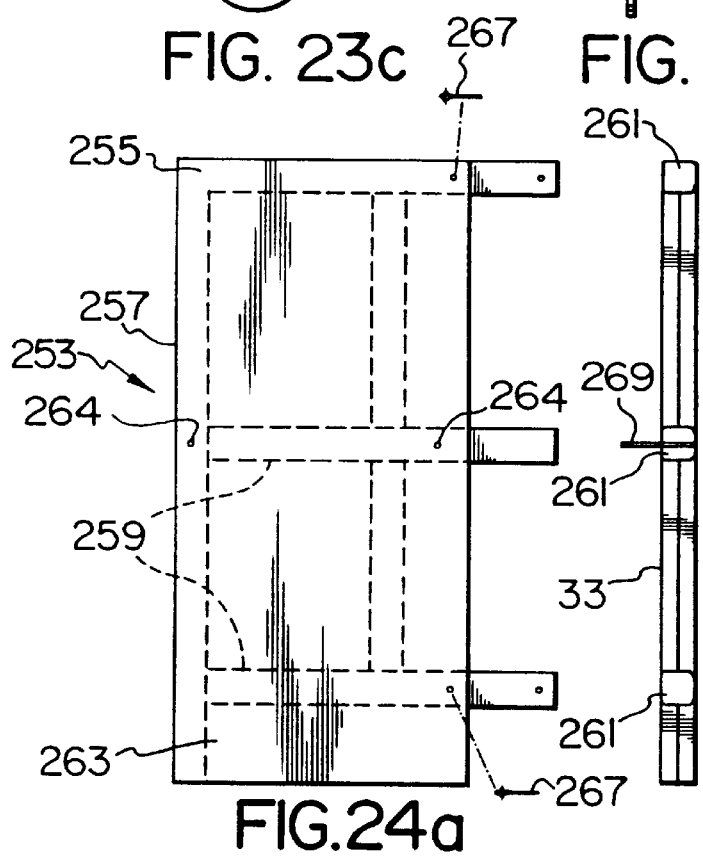
FIG. 24a   FIG. 24b
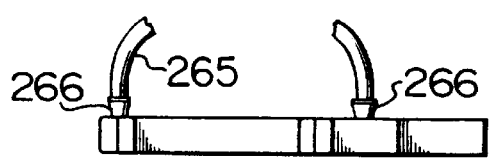
FIG. 24c

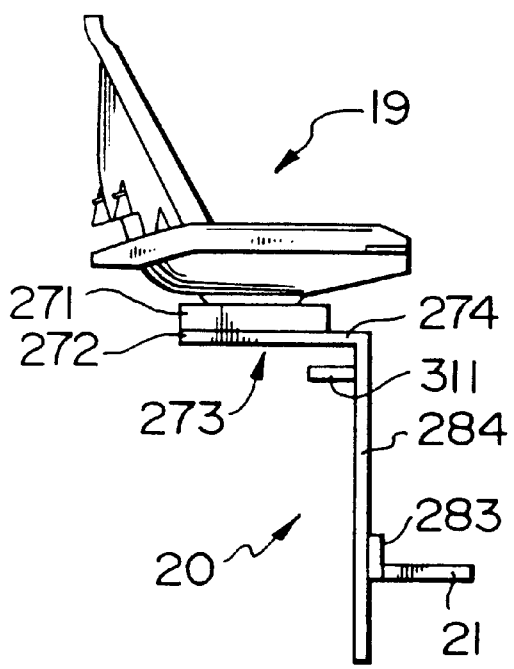
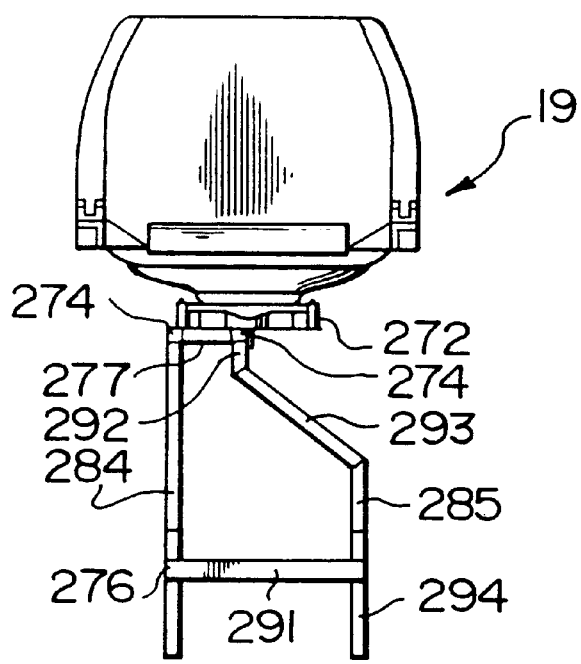
FIG. 25a    FIG. 25b
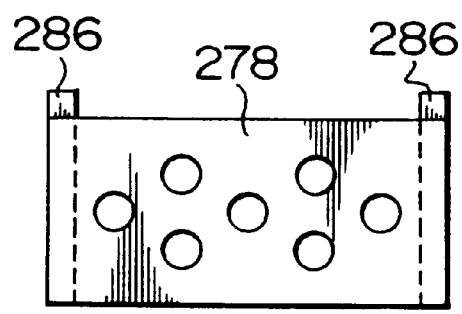
FIG. 26a
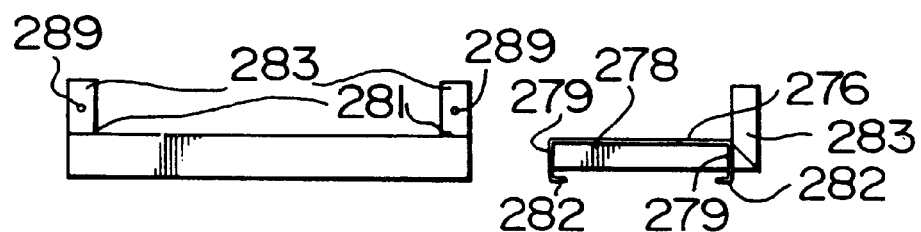
FIG. 26b    FIG. 26c

HYDRO SERVICE SYSTEM ASSEMBLY

This is a Continuation-in-Part of application Ser. No. 08/318,873, filed Oct. 18, 1994, now abandoned, which in turn is a National Stage of PCT/CA93/00067, filed Feb. 18, 1993.

BACKGROUND OF THE INVENTION

1. Technical Field

This invention is directed to a hydro service system and more particularly to a multipurpose maintenance, repair and cleaning apparatus designed to be mounted on a helicopter.

2. Background Art

It is known that various contaminants may become attached to insulators on high voltage transmission lines, and if these contaminants are allowed to build up, this may cause the insulator to flash over, causing power outages and/or physical damage to the high voltage transmission lines. It is known that insulators can be cleaned by taking the transmission lines out of service and cleaning them by hand.

It is also known that the insulators may be cleaned more efficiently by directing a stream of cleaning fluid under pressure, generally water, onto the insulator, to remove any dirt or foreign objects which have become attached to the insulator. Generally, this cleaning process is done by a bucket truck or other ground based pumping system. This is inefficient, as insulators are generally located well above the ground and are difficult to reach. As well, they are often located on terrain that is inaccessible to ground based vehicles.

It is further known that an external platform made of electrically conducting material may be mounted to the landing skids of a helicopter so that all parts of the helicopter are of the same electrical potential. This platform may then be used as a repair platform for the repair and maintenance of high voltage transmission lines. However, such platforms are generally used for repair purposes.

SUMMARY OF THE INVENTION

It is an object of the present invention to provide a work platform which supports the fluid cannon in a manner which does not create instabilities for the transportation device, particularly, which does not create flight instabilities for a helicopter.

It is another object of the present invention to provide an airborne fluid cannon for the economic and rapid cleaning of insulators on high voltage transmission lines.

It is still another object of the present invention to provide a system with a modular design. Thus, the cannon is easily removable. When removed, a wing may be readily attached to the work platform which may be used as an aerial platform to conduct servicing and repairs on high voltage transmission lines. The interchangeable aspects of the system of the present invention allow for the repair and/or maintenance of high voltage transmission lines, or the cleaning of insulators, at any location and at any height off the ground. As a helicopter is more manoeuvrable and faster than ground based equipment, cleaning and repair of high voltage transmission lines may be made more efficiently.

Accordingly, the present invention provides for a multipurpose repair and maintenance apparatus for aerial inspection, repair and controllable delivery of a stream of cleaning fluid to a workpiece for cleaning, comprising: a work platform defining a starboard side and a port side, for attachment on the skids of an helicopter; a boom assembly extending from the work platform the boom assembly defining an onboard end and an outboard end; a support box provided on the port side of the work platform for rotatably receiving the boom assembly on the work platform; a fluid circuit with a pumping assembly that pumps cleaning fluid through a fluid circuit from a fluid storage tank to a nozzle output located at the outboard end of the boom assembly; a power drive mount provided on the starboard side of the work platform for detachably fixing the pumping assembly on the work platform; and saddle assemblies that removably fix the work platform to the skids of the helicopter such that the loads on the work platform are fully balanced.

The work platform of the apparatus according to this invention, is made of electrically conductive material and has all electrically conductive parts of the boom assembly, the power drive mount, the pumping means, the fluid circuit and the saddle assemblies that removably fit connected to the electrically conductive parts of the helicopter to have the same electrical potential.

According to another aspect of the invention, there is provided a multipurpose repair and maintenance apparatus for aerial inspection, repair and controllable delivery of a stream of cleaning fluid to a workpiece for cleaning, comprising: a work platform defining a starboard side and a port side, for attachment on a helicopter skids; an external wing for supporting a person; the external wing attachable to the port side of the work platform; a power drive mount means provided at the starboard side and balancing the weight of a workman when seated on the wing; and saddle assemblies that removably fix the work platform to the skids of the helicopter such that the loads on the work platform are balanced.

The work platform of the apparatus according to this invention, is made of electrically conductive material and has all electrically conductive parts of the external wing, the power drive mount and the saddle assemblies that removably are connected to the electrically conductive parts of the helicopter to have the same electrical potential.

In another aspect of the present invention, an observer seat may be detachably mounted to the port rear cargo door area of the helicopter, allowing an observer to be secured to an observation point on the exterior of the aircraft, so as to accurately view the condition of high voltage transmission lines.

In this invention, the work platform is customized for readily installation on the landing skids of a helicopter, for example a Hughes 500 series helicopter. The cleaning fluid delivery system, or the fluid cannon, comprises a pumping assembly removably installed on the starboard side of the exterior work platform, and a fluid conduit ending with a precision nozzle attached to the controllable boom assembly that is mounted on the port side of the external work platform.

Advantageously, the conduit is mounted within the boom assembly. An operator may control the position of the boom assembly by moving it both horizontally and vertically, the range of motion being ninety degrees horizontally and forty degrees vertically.

Another advantage of this invention is that a control lever system controls the angle of the nozzle and allows that the fluid stream is precisely directed at the target. The operator easily directs the fluid stream to clean the underside and interior of insulators. This allows a more economical use of the fluid carried onboard the helicopter.

Another advantage of this invention is that the apparatus of the present invention is designed to be detachably connected to the landing skids of a helicopter, for example a Hughes 500 Series Helicopter. All parts of the system, namely the fluid circuit, the boom assembly, the boom actuator and the control lever system may be easily detached from the work platform. The pumping assembly is held in place with four bolts, and the boom assembly is secured by its own weight and one bolt, allowing the system of the present invention to be quickly and easily detached from the work platform. Once the boom assembly and the fluid circuit have been detached, the wing may be quickly attached to the work platform by sliding the wing into slot receptacles on the work platform and securing the wing to the platform with pins. The work platform may then be used by repairmen in order to conduct repairs directly on high voltage transmission lines.

Still another advantage of the invention is that all the component parts of the apparatus are mounted onto the external platform made of electrically conductive material so that they are always of the same electrical potential.

BRIEF DESCRIPTION OF THE DRAWINGS

FIG. 4 is a top view of the work platform frame;

FIG. 5 is a side view of the work platform frame;

FIG. 7d shows the power drive mount for securing the pumping assembly;

FIG. 8a illustrates a top view bearing flange for supporting a boom assembly on the work platform;

FIG. 8b shows a top view of the stop ring which is directly attached to the exterior work platform;

FIG. 8c is a side view of the stop ring of FIG. 8b;

FIG. 12 shows a lateral cross-sectional view of the spindle assembly;

FIG. 13 is a top view of the spindle assembly of FIG. 12, showing the range or horizontal motion of the spindle assembly;

FIG. 14 is a lateral view of the yoke assembly for supporting the boom;

FIG. 15 is a side view of the yoke assembly of FIG. 14;

FIG. 16 shows the spindle-yoke assembly;

FIG. 17a is a side view of the central portion of the boom;

FIG. 17b is a top view of the central portion of the boom of FIG. 17a;

FIG. 17c shows the construction of a bulkhead, which is installed between the counterweight and central portion of the boom arm;

FIG. 17d is a side view of the bulkhead of FIG. 17c;

FIG. 17e is a view of a ring flange for the attachment of the boom assembly to the actuating means;

FIG. 19a is a top view of the counterweight assembly;

FIG. 19b is a side view of the counterweight assembly of FIG. 9a;

FIG. 20a shows the construction of the boom stow assembly;

FIG. 20b shows the construction of a latch sub-assembly of the boom stow assembly;

FIG. 20c is a side view of the latch subassembly of FIG. 20b;

FIG. 21 shows an overview of the boom assembly and the mount for the control arm;

FIG. 22 shows the fluid circuit;

FIG. 23a shows a lateral view of the fluid supply tank;

FIG. 23b illustrates an end view of the fluid supply tank;

FIG. 23c illustrates a lateral view of a fitting for fixing the fluid tank to the floor of the helicopter;

FIG. 23d illustrates a front view of the fitting of FIG. 23c;

FIG. 24a illustrates a top view of the wing assembly;

FIG. 24b illustrates a right lateral view of the wing;

FIG. 24c illustrates a front view of the wing assembly;

FIG. 25a is a lateral view of the seat assembly;

FIG. 25b illustrates a front view of the seat;

FIG. 26a shows a front view of the footrest for inspector's feet;

FIG. 26b shows a top view of the footrest for inspector's feet; and

FIG. 26c shows a lateral view of the footrest for inspector's feet.

DESCRIPTION OF THE PREFERRED EMBODIMENT

Figure 1A:
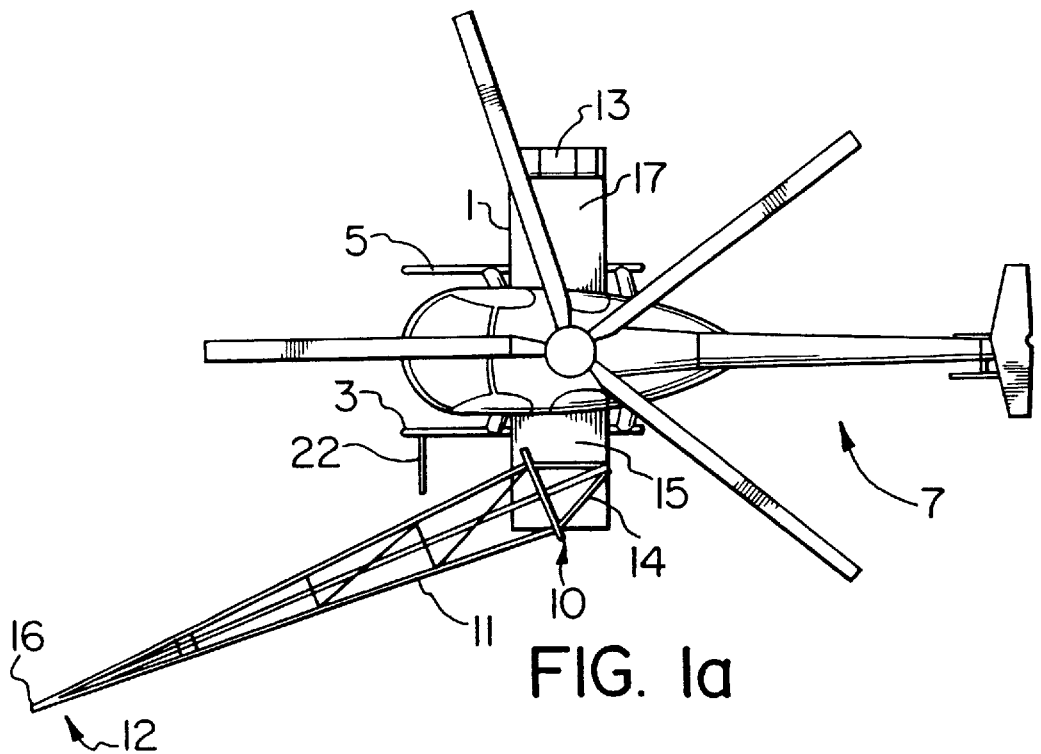
FIG. 1a is a top view of an helicopter, showing the fluid delivery system in an operating position.

FIGS. 1a, 1b, 2a, 2b, 3a, and 3c illustrate an external work platform 1 attached to the port landing skid 3 and starboard landing skid 5 of a helicopter, for example a Hughes 500 Series Helicopter, generally designated with reference numeral 7. The work platform 1 is removably attached to the skids by use of saddle assemblies 9. Attached to the platform 1 is a cleaning fluid delivery system comprising a moveable boom assembly 11 and a pumping assembly 13.

The boom assembly 11 is attached to the platform on the port side 15 of the work platform. It has an onboard end 10 and an outboard end 12. At the onboard end 10, a boom actuator 14 is provided for controlling the position of the outboard end 12.

Pumping assembly 13 comprises a pump, a pump engine and a pump engine fuel tank, all attached to the starboard side 17 of the work platform so as to counterweight the boom assembly 11. Cleaning fluid, carried onboard the helicopter in a fluid storage tank (not shown), is pumped out by the pump through a rigid tube arranged inside the boom assembly 11 and delivered under pressure through a nozzle 16 at the outboard end 12 of the boom assembly 11.

A boom stow assembly 22 is provided for maintaining the boom assembly 11 latched during displacement of the helicopter between the jobs.

Figure 2A:
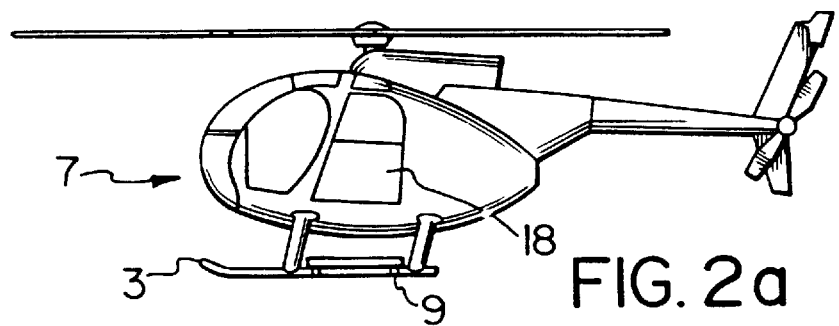
FIG. 2a is a side view of the helicopter showing the attachment of the external work platform to the helicopter skids.
Figure 3A:
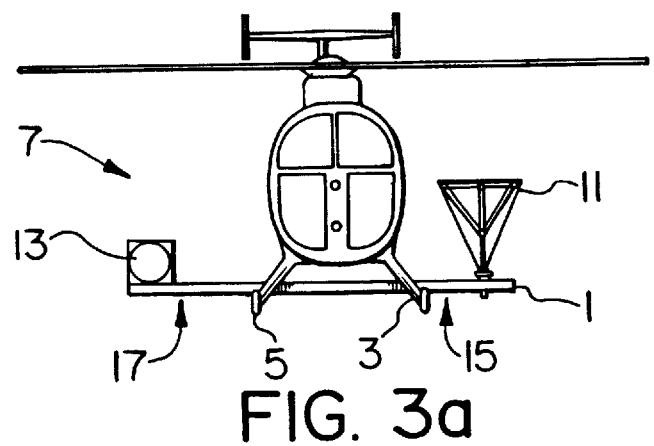
FIG. 3a is a front view of the helicopter, showing the boom in the transport position.
Figure 2B:
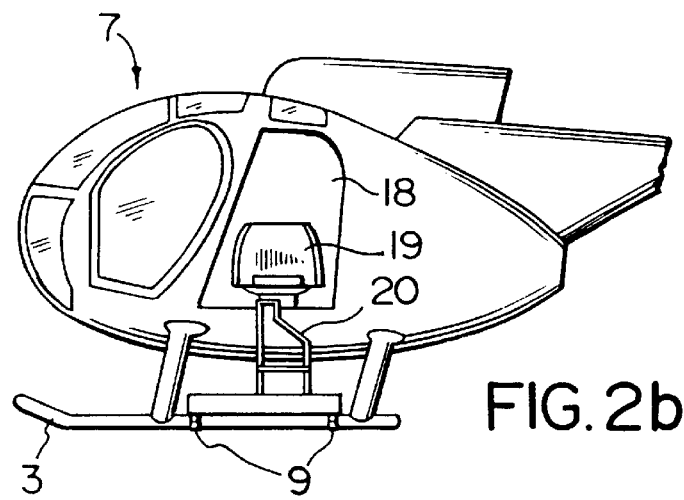
FIG. 2b is a side view of the helicopter showing the inspector's seat attached to the portside door.
Figure 3B:
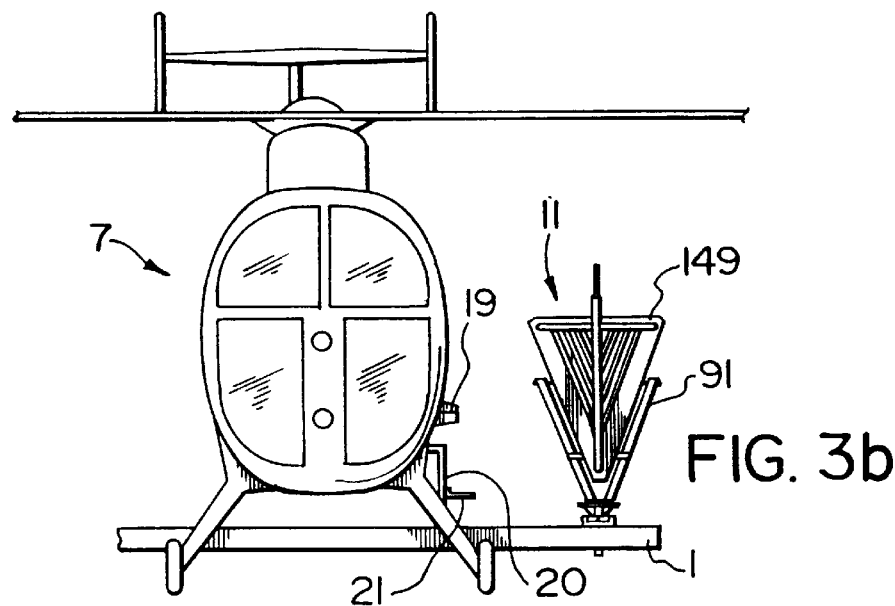
FIG. 3b is a front view of the helicopter, showing the inspector's seat attached to the portside door.

FIG. 2a is a side view of the helicopter, boom assembly 11 removed, showing the attachment of the external work platform 1 on saddle assemblies 9 and FIG. 2b shows the port rear cargo door area 18 with the inspector's seat 19 installed. The seat is attached to the door are 18 with a seat bracket 20. Step 21 is provided for accommodating inspector's feet FIG. 3a is a front view of the helicopter, showing the boom assembly in the transport position. FIG. 3b is a front view of the helicopter, illustrating the inspector's seat attached to the port side door.

The external work platform 1

In a preferred embodiment, the external work platform 1 measures 366 cm in total length and 91 cm in total width. It is designed to be mounted off-centre on the landing skids of the helicopter, so that the port side 15 of the work platform 1 extends 112 cm from the port landing skid 3 of the helicopter, while the starboard side 17 of the work platform extends 142 cm from the starboard landing skid 5 of the helicopter. This arrangement is made so that when the boom assembly 11 and the pumping assembly 13 are attached to the external work platform 1, the helicopter is counterbalanced.

The frame

The metal frame 23 of the external work platform 1 is illustrated in FIGS. 4 and 5. Frame 23 is preferably constructed of lightweight Aluminum, which is electrically conductive. A front channel beam 25 and a rear channel beam 27 form the length of the work platform 1. These channel beams are connected by parallel intercostal channels, namely two rear intercostal end channels 29, at the starboard side 17 of the work platform 1, intermediate supports 35, an intercostal channel 31, and a port end intercostal channel 33 at the port side 15 of the work platform.

The intercostal channels 29, 31 and 33, together with intermediate supports 35 are arranged in their appropriate positions as shown in FIG. 4, between the forward channel beam 25 and rear channel beam 27. Diagonal struts 37 are used to brace the intercostal supports.

In the following, a preferred embodiment of the frame is disclosed. The front channel beam 25 is constructed from a 20 cm by 366 cm sheet of aluminum 31 mm thick, which is bent twice at a 90 degree angle along its long axis so as to make a "U" channel measuring 5 cm×5 cm×10 cm. The rear channel beam 27 is constructed in a similar manner, but is constructed from an 20 cm by 366 cm sheet of aluminum 16 mm thick. Lightening holes 26 are milled into the front and rear channel beams 25 and 27 so as to decrease the weight of the structure while retaining rigidity.

Figure 6A:
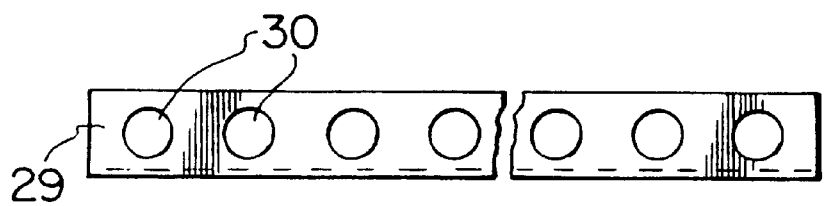
FIG. 6a shows an intercostal end support for the starboard side of the frame.

The intercostal channels 29 are constructed by fashioning a "U" channel measuring 44 mm×44 mm×10 cm, as shown in FIG. 6a.

Figure 6B:
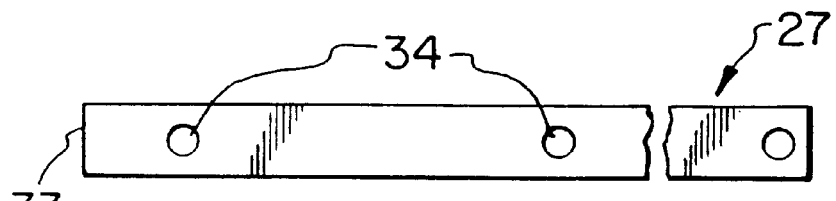
FIG. 6b shows an intercostal end support for the port side of the frame.

The port end intercostal channel 33 is constructed from a piece of Aluminum 91 cm long and 18.4 cm wide, that is bent into a "U" shape, and has lightening holes punched in it as shown in FIG. 6b. Three receptacle holes 34 are then cut into this channel, the first hole being flush with the end that abuts with the front channel beam 25, the second being placed in the exact centre of the intercostal, and the third being placed 14 cm from the end which abuts with the rear channel beam 27. These holes are used for mounting the support box, as it will be described later.

Figure 6C:
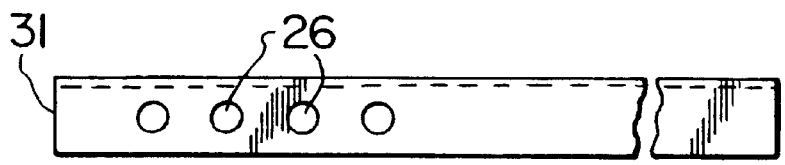
FIG. 6c shows another intercostal end support for the port side of the frame.

Intercostal channel 31 is constructed from a piece of Aluminum 90.6 cm long and 18.4 cm wide, which is bent and has lightening holes punched in it as shown in FIG. 6c. Three plate ends are then constructed from a piece of Aluminum 15 cm wide and 9.5 cm high. Either end of the "Z" intercostal 31 is then welded to the centre of a plate end to form a "Z" intercostal support. As for channel 33, three receptacle holes 34 are then cut into this channel, the first hole being flush with the end that abuts with the front channel beam 25, the second being placed in the exact centre of the intercostal, and the third being placed 14 cm from the end which abuts with the rear channel beam 27.

An intermediate support 35 is manufactured from a 5 cm square rectangular tubing cut into 91 cm lengths. Six plate ends are constructed by taking sheets of Aluminum 20 cm in width and 13 cm in height, then bending them at a ninety degree angle 38 mm from their base, so as to form "L" joints. The ends of the tubing are then welded to the centre of the plate ends to form the intermediate support 35.

The diagonal studs 37 are constructed of tubular aluminum having a diameter of 5 cm. They are hand cut to fit as shown in FIG. 4 and are hand trimmed to fit flush with the intercostal supports and channel beams that they fit up against.

The intercostal channels 35 and 31 are then bolted to the front channel beam 25 and to the rear channel beam 27 for example, by means of four 6 mm structural steel bolts, 6 mm washers, and 6 mm steel self locking nuts. The port end intercostal channel 33 and rear intercostal channels 29 are welded to 25 and 27. The diagonal struts 37 are then positioned as shown in FIG. 4 and are welded to the intercostal supports and channel beams to which they come in contact.

Three stub tube housing assemblies (not shown) are then constructed from rectangular Aluminum tubing having an internal height and width of 5 cm, and are cut into 12.7 cm lengths. These are then welded to the inside of the port end intercostal 33 so that the inside of the tube is flush with the receptacle holes 34.

The support box

A support box 39 is provided at the port end side 15 of the platform for supporting the boom assembly 11. The support box 39 is formed by two bridge beams 41, of a structure shown in FIG. 7a, and two anchor channels 43, as shown in FIG. 7b. The anchor channels 43 are welded to the bridge beams 41 as shown in FIG. 4 so as to create the support box 39 measuring 25.4 cm square. This support box 39 is positioned 19 cm from the front channel beam 25 and is connected to the port end intercostal 33 by rivets and to the "Z" intercostal 31 by welding.

Figure 7A:
FIG. 7a illustrates the bridge "Z" supports for the support box.
Figure 7B:
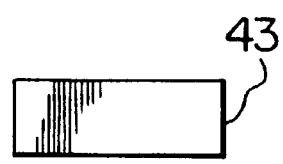
FIG. 7b shows a top view of the anchor channels for the support box.

Preferably, the bridge beams 41 are constructed from a piece of Aluminum 55.9 cm long, and 15.9 cm wide, which is bent into a "Z" channel as shown in FIG. 7a. Two shear clips are then constructed from pieces of Aluminum 6.3 cm long and 5 cm wide, which are bent in half to form an "L" shape 2.5 cm wide by 6.3 cm long. The long edge of the shear clips is welded to the side of the bridge beam 41 which abuts up next to the port end intercostal channel 33 so as to present a flat surface to this channel. The anchor channels 43 are constructed from a piece of Aluminum 25.4 cm long and 14.6 cm wide, which is bent into a "U" channel as shown in FIG. 7b.

Figure 10A:
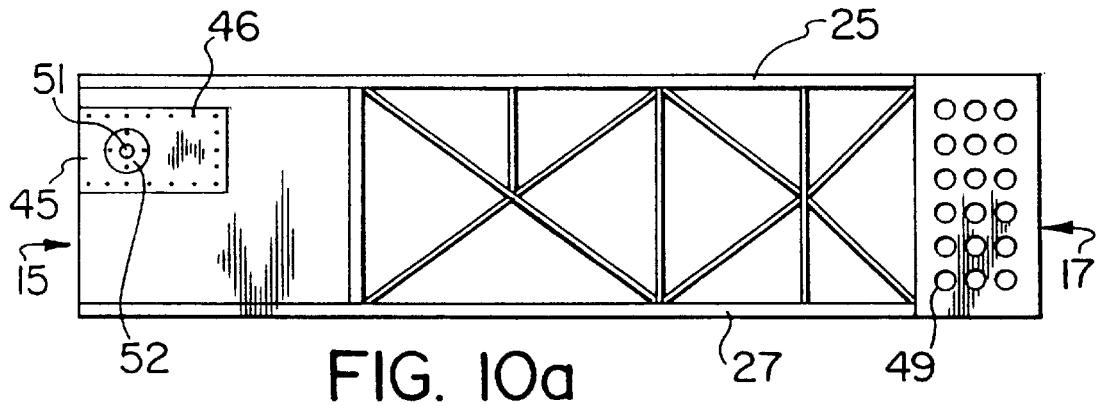
FIG. 10a illustrates a top view of the assembled work platform.

The support box 39 is designed to support the boom assembly and to allow rotation thereof in a horizontal plane by use of a spindle, which will be described later. To this end, a spindle shaft 50 is inserted in a hole 51 in the support box 39 of the work platform 1, such that the spindle can rotate while carrying the boom assembly 11. The support box 39 is protected on both sides with a cover plate 45, as illustrated in FIGS. 10a and 10c. The cover plates 45 are preferably constructed from a sheet of aluminum measuring 12.7 cm wide by 91 cm long. A hole 51 is 3.8 cm in diameter and is milled out of the cover plates 45. The cover plates 45 are attached to the upper and lower portion of the support box 39 as shown in FIGS. 10a and 10c with structural steel screws 46.

The hole 51 is further formed with two self-lubricating steel bearing flanges for rotatably receiving a 3.8 cm shaft 50 of the spindle. The flanges 52 are modified by drilling four 6 mm holes 53 as indicated in FIG. 8a. The first flange is inserted and secured to the top cover plate 45 with four bolts, four nuts, and eight rivets inserted through the holes 53. The second flange is inserted and secured to the bottom cover plate 45 in the same manner.

A stop ring 54 is attached on the face of platform 1 over the flange 52, for limiting the rotation of the boom assembly 11. The spindle shaft 50, and consequently the boom assembly 11 is allowed to rotate 90 degrees only, for security of travel of the helicopter. The stop ring 54 is illustrated in FIG. 8b. It is constructed preferably by cutting a piece of aluminum 1.3 cm thick so as to produce a circular ring 55 having 15.2 cm in diameter, the centre of which is milled out so as to produce a hole 56 with 8.9 cm in diameter. Four bolt holes 57 with a diameter of 6 mm are drilled in this ring 55. Two pieces 58 of aluminum 1.6 cm thick, 3.8 cm high, and 11.9 cm long are then bent so as to be flush with the edge of the circular ring 55 as shown in FIGS. 8b and 8c, and are positioned opposite each other so that the ends of each piece are located at a bolt hole 57. The pieces 58 are then welded to the circular ring to produce the finished stop ring 54. The stop ring 54 is then attached to the platform 1 by four bolts that are placed through the bolt holes 56 of the stop ring and the bolt holes 53 of the modified bearing flange 52. When properly assembled, the pieces 58 should protrude from the forward right and left rear quadrants of the stop ring 55.

The power drive mount

Figure 7C:
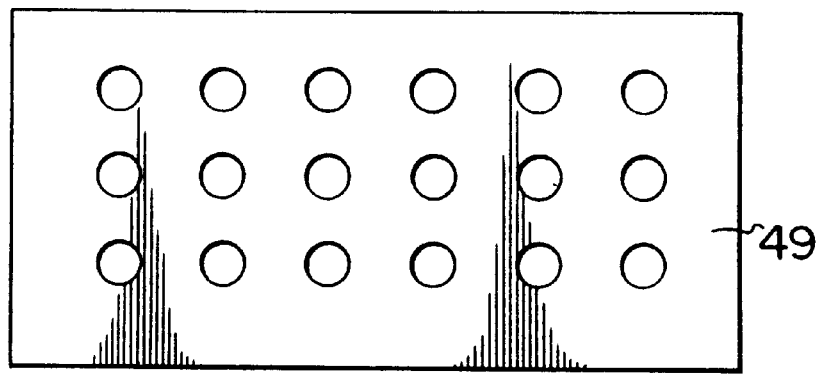
FIG. 7c illustrates a top view of the shear panel for the power mount drive.

A power drive mount 44 for holding the pumping assembly is illustrated in FIG. 7d. The power drive mount 44 is made from two 91 cm lengths 45, three 9.5 cm lengths 46 of 5 cm×5 cm square Aluminum tubing, a first plate 47 measuring 24.1 cm in length and 7.6 cm in width, and a second plate of Aluminum 48 measuring 24.1 cm in length and 9.1 cm in width. These parts are then welded together as illustrated in FIG. 7c.

Two shear panels 49 are constructed from a sheet of Aluminum measuring 43.2 cm wide by 91 cm long, as shown in FIG. 7d. Eighteen lightening holes are punched in each channel. The shear panels are then bolted to the upper and lower surface of the starboard side of the platform 1, on rear intercostal channels 29. Four 6 mm holes are drilled through the shear panel and the front channel beam 25 and rear channel beam 27, respectively.

The power drive mount is attached at the starboard side 17 of the work platform 1 by use of four holes having a diameter of 6 mm drilled in the corners of the power/drive mount so that they match up with the bolt holes previously drilled in the work platform.

The entire upper surface of the work platform which has not already been covered by either the cover plate 45 or shear panel 49 is then covered with a screen made of aluminum mesh. This is then spot welded to the frame of the external work platform, so that all parts of the external work platform are of the same electrical potential.

Fixing the platform to the helicopter

Four saddle assemblies 9 attached to the helicopter skids, which cooperate with the slide/guide attachments 59, 61 and 63, removably fix the external work platform 1 to the helicopter.

Figure 9A:
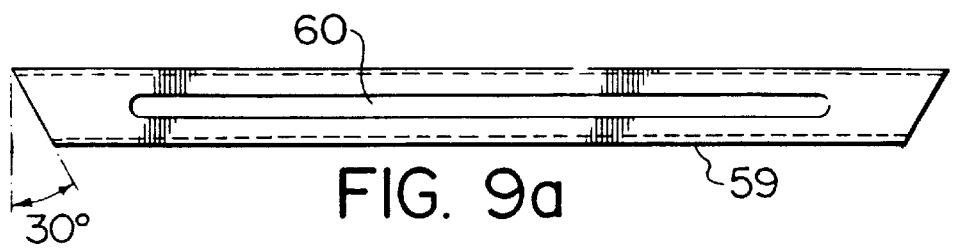
FIG. 9a shows the construction of a forward starboard slide/guide attachment.
Figure 9B:
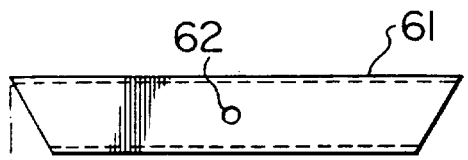
FIG. 9b shows the construction of a forward port slide/guide attachment.
Figure 9C:
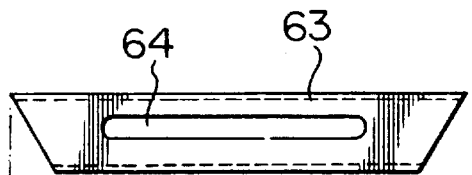
FIG. 9c shows the construction of a rear port slide/guide attachment.

Slide/guide attachments 59, 60, and 61, shown in FIGS. 9a to 9c, are fixed on the back face of the work platform. All slide/guide attachments are constructed from 5 cm square Aluminum tubing which have their ends cut at a 30 degree angle.

Figure 10B:
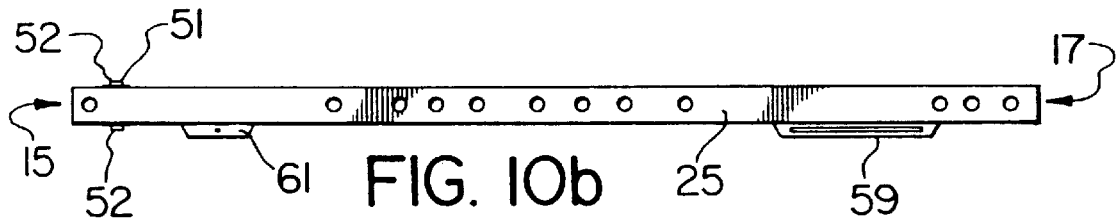
FIG. 10b shows a side view of the assembled work platform, showing the slide/guide attachments.
Figure 10C:
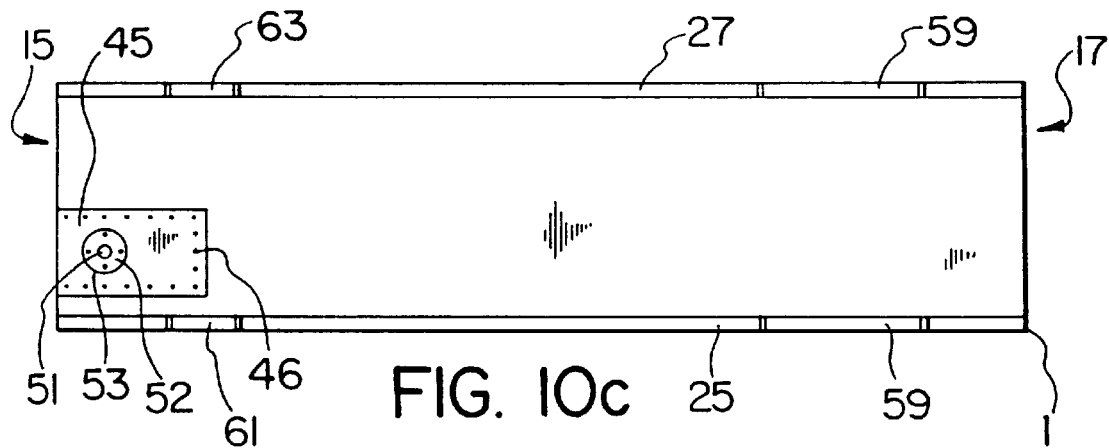
FIG. 10c shows the bottom view of the work platform, showing the slide/guide attachments, and placement of the modified bearing flange.

Two starboard slide/guide attachments 59 are respectively mounted to the bottom edge of the front channel beam 25 and rear channel beam 27 with four bolts, washers and nuts as shown in FIGS. 10b and 10c. A starboard slide/guide attachment is preferably 64.8 cm long, and has an area of the tubing 60 measuring 1.3 cm in height and 48.9 cm in length milled out of the tube, as shown in FIG. 9a. Area 60 allows that the platform be displaced accurately to the equilibrium position when mounted on the skids.

The forward port slide/guide attachment 61 is mounted to the bottom edge of the front channel beam 25 by means of four bolts, washers and nuts, so that the centre of the slide is attached to the front channel beam at a position 56 cm from the front left corner, as shown in FIG. 10c. The forward slide/guide attachment measures 30.5 cm long, and has a 8 mm hole 62 bored through the centre of the tubing, as shown in FIG. 9b.

The rear port slide/guide attachment 63 is attached to the bottom edge of the rear channel beam 27 with four bolts, washers and nuts, so that the centre of the slide is attached to the rear channel 27 at a position 56 cm from the end of the channel beam. The rear slide/guide attachment measures 30.5 cm long, and has an area of the tube 64 measuring 1.3 cm high and 17.8 cm in length that is milled out of the centre, as shown in FIG. 9c. Area 64 allows that the platform be displaced when mounted on the skids.

Figure 11A:
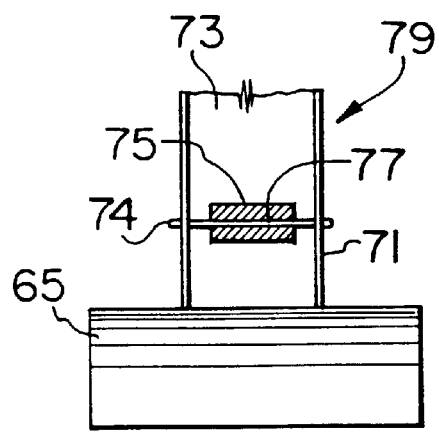
FIG. 11a shows the saddle assembly.
Figure 11B:
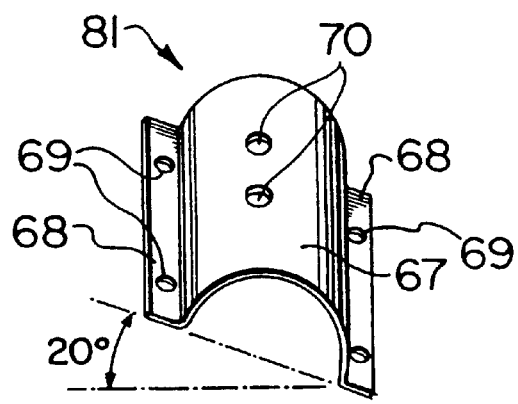
FIG. 11b shows a saddle leg.

A saddle assembly 9 comprises an upper assembly 79 designed to be attached to a slide/guide assembly, and to a lower assembly 71 which is bolted directly to one of the helicopter skids 3 or 5. The upper and lower assemblies are illustrated in FIGS. 11*a* and *c*, respectively.

Figure 11C:
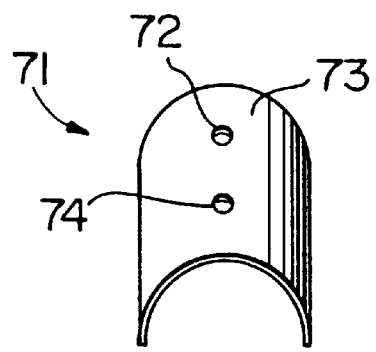
FIG. 11c shows a lower saddle assembly.
Figure 11D:
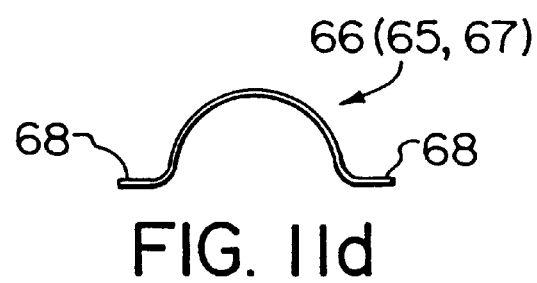
FIG. 11d shows the construction of the saddle shell.

In the preferred embodiment, an upper plate 65 and a lower plate 67 are constructed by making a saddle shell 66 from steel alloy, which is bent to form a circular shell with an internal radius of 4 cm, and two wings 68 measuring 2.5 cm, as shown in FIG. 11*d*. Each of the wings 68 on the saddle shell 66 is drilled with two 6 mm diameter holes 69 so as to accept a bolt. The lower plate then has two 6 mm diameter holes 70 drilled into it at a 20 degree angle from the top of the plate, so as to be mounted directly onto the underside of the helicopter skid through pre-existing bolt holes on the helicopter, which are used to mount skid plates.

Saddle legs 71 are then constructed as shown on FIG. 11*c* with two 16 mm holes 72 and 74 being drilled into them. Shear webs 83 are constructed from a piece of steel 5 cm in height and 6.4 cm in width. The saddle legs 71 are then welded to the shear webs 83 to form a saddle box 73 measuring 7.9 cm by 6.4 cm. The saddle box is then welded to the saddle plate 65 at a 20 degree angle from the centre of the saddle leg to form the rough saddle assembly 79.

A roller 77 is constructed by taking a Nylon rod 2.5 cm in diameter and 5 cm in length, and boring a 1.3 cm hole through the length of the rod. A spacer/bushing 75 is constructed by taking a Steel Alloy tube 1.3 cm in diameter and 6.3 cm in length and boring a 8 mm diameter hole through the length of the rod. The spacer/bushing 75 is then slipped through the roller 77 so that the roller is able to slide on the spacer/bushing. The spacer/bushing is then affixed inside the saddle box 73 by means of an 8 mm bolt (not shown), which is inserted through the lower of the bolt holes 74, and through the spacer/bushing. The bolt is then affixed by a washer and nut, producing the finished upper saddle assembly 79.

The saddle legs are mounted on the helicopter skids as follows. A liner made of neoprene rubber is then cut to fit the curved portion of the saddle shell which comes directly in contact with the landing struts, and is affixed with adhesive. The lower saddle plate assembly is bolted to the pre-existing bolt holes on the underside of the helicopter landing skid. The saddle assembly 79 is then bolted to the lower plate assembly by four bolts nuts and washers. The saddle legs should stand perfectly vertical when properly connected to the landing struts. As well, the port helicopter landing strut is between the upper and lower saddle shell at a distance of approximately 20.3 cm from the front of the port helicopter landing strut. A bonding strap is then attached between the boom stow assembly and the helicopter so that both are of the same electrical potential.

The external platform is fixed on the helicopter by four saddle assemblies 79 by attaching the upper plates to the respective slide/guide assemblies. Thus, a bolt is run through the top hole 72 of a forward saddle leg 71, through the slide/guides 59, and out through the top hole of the other forward saddle leg. The bolt is held in place with a washer and nut. Similarly, the rear saddle legs are attached with a bolt running through the top holes 72 and the slide/guides 61 and 63. This method of attachment allows the work platform to be held securely in place at all times, while allowing the landing struts of helicopters to flex upon the takeoff or landing. A bonding strap is then attached between the external work platform and landing skids so as to ensure that both are of the same electrical potential.

As already mentioned, the work platform 1 is a multi-purpose platform in that it maybe used for aerial cleaning and for inspection/repair of for example electrical lines.

When the work platform is used for cleaning purposes, for example for cleaning the insulators of the high voltage transmission lines, a cleaning fluid delivery system is detachably attached to the work platform 1.

The boom assembly

The boom assembly comprises the spindle-yoke assembly 119, the boom 120, and a counterweight assembly 117. The support box on the port side rotatably receives the shaft of the spindle-yoke assembly and allow for easy dismantling the boom assembly and the fluid circuit so that the platform may be used for inspection or repair. This later means has been disclosed above in connection with the work platform 1.

The spindle-yoke assembly 119

The spindle-yoke assembly is placed at the port side 15 of the work platform and comprises a spindle and a yoke for driving the onboard end 10 of the boom assembly 11 to rotate in a horizontal and a vertical plane.

The spindle-yoke assembly is comprised of a spindle 89 adapted to rotate in the hole 51 provided in the work platform, and a yoke 91, coupled to the boom assembly 11. The spindle 89 rotates the onboard end 10 of the boom assembly 11 in a horizontal plane, while the yoke 91 allows rotation of the end 10 in a vertical plane. As a result, the outboard end 12 may attain a desired position.

Spindle 89 is illustrated in FIGS. 12 and 13. It comprises the spindle shaft 50, which is fixed at one end to a base plate 93, so that both rotate together. A stop pin hub 98 is also fixed on shaft 50. The distance between hub 98 and the other end of shaft 50 is selected to be slightly more than the thickness of the work platform 1. The stop pin hub 98 is also fixed on shaft 50 and is manufactured with two protruding plugs 103, which travel in the space created between circular ring 55 and pieces 58 (see FIG. 8*b*). The spindle is preferably constructed by fashioning the base plate 93 from a piece of aluminum having a diameter of 22.9 cm. To the centre of the base plate 93 is welded the spindle shaft 50 of 3.8 cm aluminum tubing 27.9 cm long. The spindle shaft 50 is supported by eight triangular shaped gussets 95 that are constructed from aluminum sheeting 9 mm thick. The gussets 95 are welded to the base plate 93 and spindle shaft 50.

Pin hub 98 comprises a circular rotator ring 97 constructed from a piece of Aluminum 2.5 cm thick with a diameter of 12.6 cm. Two tap holes 101 that are 2.5 cm deep having a diameter of 11 mm are drilled in the centre plane of the rotator ring 97 at 180 degree angles to each other. A hex head bolt 102 that is 13 mm wide and 2.5 cm long is then screwed into the tap holes 101, so that 13 mm of the shaft of the bolt is left protruding. The head of the bolt is then cut off to leave a metal plug 103 which is 13 mm long and 13 mm wide protruding from the rotator ring 97.

A circular hole 104 with a diameter of 3.8 cm is then milled in the centre of the rotator ring 97 to produce the stop pin hub 98. The stop pin hub 98 is then slid over the spindle shaft 50 until it is 5.7 cm from the base plate 93. The stop pin hub 98 is then welded to the spindle shaft to produce the completed spindle assembly 89.

When the spindle assembly 89 is dropped into the stop ring 54, the spindle assembly can only be rotated 90 degrees horizontally, preventing the operator from striking the tail of the helicopter with the boom. The rotation of the spindle is limited to a 90 degrees angle, due to the limited trip of plugs 103 inside the pieces 58 of the stop ring 54.

The shaft 50 is provided with a hole 94. A bolt is inserted into this hole after the spindle is dropped into the stop ring, for attaching the boom means to the work platform, while allowing the shaft to rotate.

The yoke assembly 91 comprises a base plate 107 and two arms 109, as illustrated in FIGS. 14 and 15. The arms are fixed at one end to the base plate 107 and diverge towards the other end, to support a shaft 117. Shaft 117 is coupled with the onboard end of the boom assembly to allow rotation thereof in a vertical plane. The base plate 107 is fixed to base 93 of the spindle assembly to rotate together around a vertical axis.

The base plate 107 is preferably constructed by cutting a circular piece that has a diameter of 15.2 cm and a depth of 5 mm, then milling a hole 108 having a diameter of 2.5 cm in the centre. The yoke arms 109 are constructed from 3.8 cm×3.8 cm square Aluminum tubing, the base of which is cut at a 23 degree angle. A 19 mm hole 110 is drilled through the free end of each of the yoke arms 109 at a 23 degree angle to the surface of the yoke arm, as demonstrated in FIG. 14. A metal bushing 111 having a diameter of 19 mm and a length of 5 cm is then inserted into each hole 110 so that either end of the bushing 111 overlaps the end of the yoke arm 109 by 6 mm. The bushing is then welded to the yoke arm. A pin-spring hole 112 is then drilled through the yoke arm and bushing.

The yoke arms 109 are welded to the base plate 107 so that the arms are directly opposite each other. Four gussets 113 are welded to the base plate 107 and yoke arms 109 as shown in FIG. 15 so as to provide additional support for the yoke arms.

The shaft 117 is inserted through holes 110 and through the holes 156 of the bulkhead 149 (see FIGS. 17c, 17d) for coupling the yoke to the boom assembly 11. Shaft 117 is constructed from a piece of Aluminum tubing having a diameter of 1.6 cm and a length of 60.3 cm. Two 17.8 cm long shaft plugs 118 are fashioned from a rod of Aluminum having a diameter of 14 mm. The shaft plugs 118 are then inserted into either end of the shaft 117 so that the end of the shaft plug is flush with the end of the shaft.

Two up stops 115 are welded on the interior of each yoke arm so that the top of the up stops is attached 21.1 cm from the surface of the base plate. A stop 115 is made from a piece of Aluminum having a height of 5.7 cm and a width of 8.9 cm, which is bent at a 90 degree angle at the 2.5 cm mark along its height, to produce a "L" shaped piece of metal 8.9 cm long.

The spindle yoke assembly 119 is created by bolting the base plate 93 of the spindle assembly 89 to the base plate 107 of the yoke assembly 91 as shown in FIG. 16. The entire structure is of the same electrical potential. The spindle yoke assembly 119 is then dropped into the spindle shaft hole 51 of the flange 52 so that the two metal plugs 103 come into contact with the stop ring 54. The spindle yoke assembly is secured after being inserted through the platform 1 with a bolt, and a bonding strap is attached between the spindle yoke assembly and the platform 1 so that both are of the same electrical potential. The boom arm is then placed on the spindle yoke assembly 119, by placing the shaft 117 trough the holes 110 in the yoke arms of the spindle yoke assembly 119, and the holes 156 in bulkhead 149 of the boom arm, so as to allow the boom arm to swivel vertically. A bonding strap is then attached between the boom and the spindle yoke assembly so that both are of the same electrical potential.

The boom 120

The boom assembly preferably comprises two parts, an onboard or central section 121, and an outboard section 157 which are designed to be broken apart for ease of transport.

In a preferred embodiment, the central section 121, illustrated in FIGS. 17a–17e, comprises a lower longeron 125 and two upper longerons 127. The lower longeron 125 is constructed from Aluminum tubing 3.9 cm in diameter and 366 cm in length. Each upper longeron 127 is constructed from Aluminum tubing 2.5 cm in diameter and 370 cm in length. The upper and lower longerons are connected by three horizontal member stays 130, 134 and 138, and six "V" member stays 129, 131; 133, 135; and 137, 139. The stays are preferably manufactured of Aluminum tubing of differing lengths having a diameter of 19 mm, and are arranged in a triangular fashion between the upper and lower longerons so that the central section is shaped as a frusta-pyramidal body of a large end tapering to a small end. The stays at the large end of the boom is comprised of two "V" stays 129, 131 which are 47 cm long, and a matching horizontal stay 130, which is 58.5 cm long. The middle portion consists of the "V" stays 133 and 135, 39.2 cm long and the horizontal stay 134, 31.8 cm long. The small end consists of the "V" stays 137 and 139, 21 cm long, and the horizontal stay 134, 20.3 cm long. The horizontal stays and "V" member stays are trimmed so as to fit flush against the upper and lower longerons to which they come into contact, and are welded into place, as shown in FIGS. 17a and b.

Diagonal members 140–143 are used to further reinforce this structure. Two members 140 are constructed from tubing having a diameter of 19 mm and a length of 138.4 cm, two members 141 from tubing having a diameter of 13 mm and a length of 128.9 cm, one member 142 from a tube having a diameter of 2.5 cm and a length of 132 cm, and one member 143 from a tube having a diameter of 13 mm and a length of 47 cm. These are placed as shown in FIGS. 17a and 17b, are trimmed so as to fit flush against the stays and longerons to which they come into contact, and are welded into place.

A vertical slot 145 is then cut into the end of the lower longeron 125, at the large end of the central section of the boom. At the same end, a hole 146 having a diameter of 9.5 mm is then drilled through the two upper longerons 127 as shown in further detail on FIG. 17e. Two bushings 147 are constructed from Aluminum tubing having an outer diameter of 9.5 mm, and inner diameter of 6 mm, and a length of 3.2 cm. The bushing 147 is then inserted into the hole 147, and is welded to the upper channel member. These holes are used for connecting the longerons to the counterweight, as it will be described later.

A triangular bulkhead 149 having sides 150, 152 and 154 is attached to the onboard end 10 of the boom assembly 11 for further reinforcing the structure and for connection with the boom actuator 14. The bulkhead is shown in FIGS. 17c and 17d, has a triangular shape and is provided with connecting holes 151. Holes 151 receive the onboard end of longerons 125 and 127. Two pivot channels are provided on the sides 150 and 152, to receive shaft 117 along a direction parallel to side 154.

The bulkhead is preferably manufactured from an Aluminum panel 74.9 cm wide and 88.3 cm high, cutting it into a triangular shape, and placing lightening holes and connector holes 151. One upper channel stiffener 153 is constructed from a sheet of Aluminum 11.4 cm wide and 71.1 cm long, which is bent twice 19 mm from either side of this piece so to make a "U" shaped piece of metal 7.6 cm wide and 71.1 cm long fixed along side 154. Two lower channel stiffeners 153 are then constructed from a sheet of Aluminum 9.5 cm wide and 86.4 cm long, which is bent twice 19 mm from either side of the piece so as to make a "U" shaped piece of metal 5.7 cm wide and 86.4 cm long. The channel stiffeners are then placed on the panel along sides 150 and 152, are trimmed so as to form a perfect triangle flush with the edge of the panel, and are riveted into place.

The pivot channels 155 are preferably manufactured from a piece of Aluminum 19 cm wide and 50.8 cm long, which is bent twice 6.4 cm in from either side so as to make a "U" shaped piece of metal 6.4 cm square and 50.8 cm long. The corners forming the bottom of the "U" of either end of the pivot channel are then cut off, and hole 156 having 2.7 cm in diameter is bored in the centre of each pivot channel, as shown in FIG. 17d. The pivot channels 155 are then inserted into the channel of each channel stiffener 153 on sides 150 and 152, and are riveted in place in accordance with FIG. 17d. The lower longeron 125 and the two upper longerons 127 are then inserted through the connector holes 151 in the bulkhead 141.

Figure 18A:
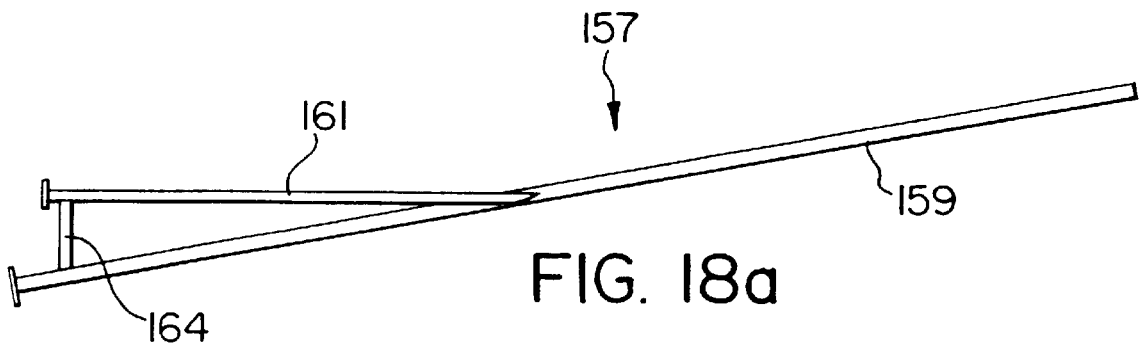
FIG. 18a is a side view of the outboard portion of the boom.
Figure 18B:
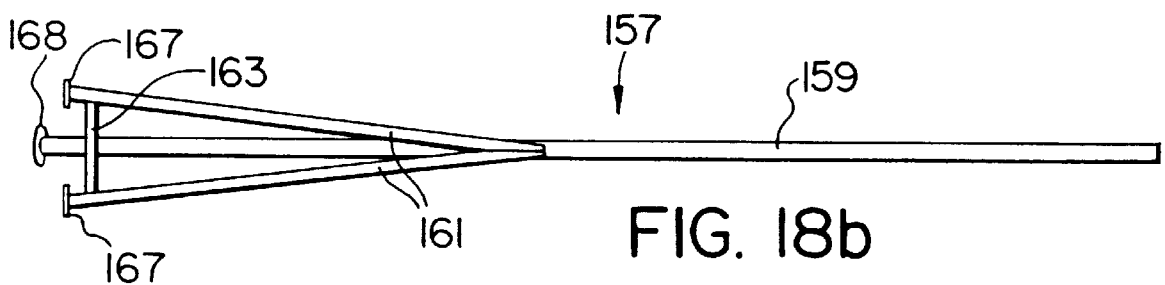
FIG. 18b is a top view of the outboard portion of the boom.
Figure 18C:
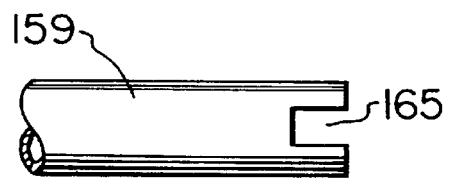
FIG. 18c is a right hand side view of the tip of the outboard portion of the boom.

The outboard section 157 of the boom arm comprises a lower longeron 159 and two upper longerons 161, adapted to be coupled with the respective longerons of the central section. Preferably, the upper longerons 161 are made of Aluminum tubing 2.5 cm in diameter and 127 cm in length, and the lower longeron 159 is made of Aluminum tubing 4.1 cm in diameter and 288.3 cm in length. The end of each upper longeron 161 is then trimmed so it attaches flush to the lower longeron 159 as shown in FIGS. 18a and 18b. A horizontal stay 163 and two "V" member stays 164 are used to reinforce the structure of the outboard section. Preferably, the horizontal stay 163 is constructed from tubing having a diameter of 19 mm and 18.3 cm in length, and the "V" member stays 164 are constructed from similar tubing 20.5 cm in length. The horizontal stay and "V" member stays are then trimmed so as to fit flush between the upper and lower longerons. The two upper longerons 161, the lower longeron 159, and the horizontal 163 and "V" member stays 164 are then welded together. A notch 165 having a height of 1.6 cm and a depth of 25 cm is then cut out of the right side of the lower longeron outboard end, as shown in FIG. 18c.

Figure 18D:
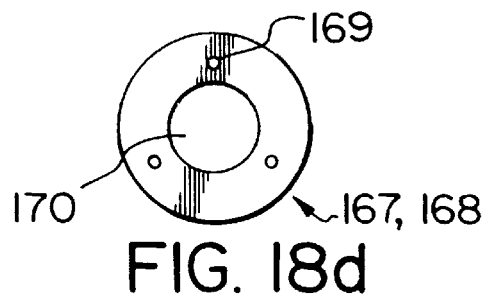
FIG. 18d illustrates a ring flange.
Figure 25C:
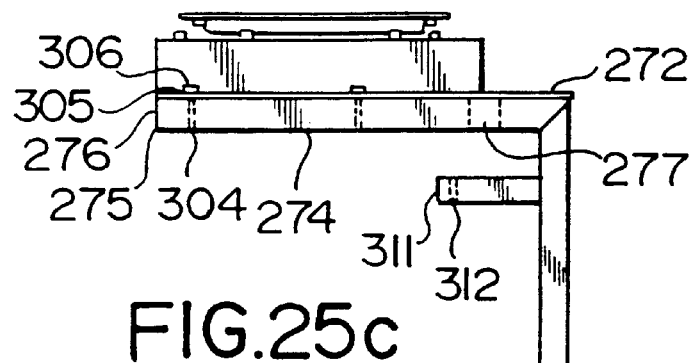
FIG. 25c shows a lateral view of the seat support.
Figure 25D:
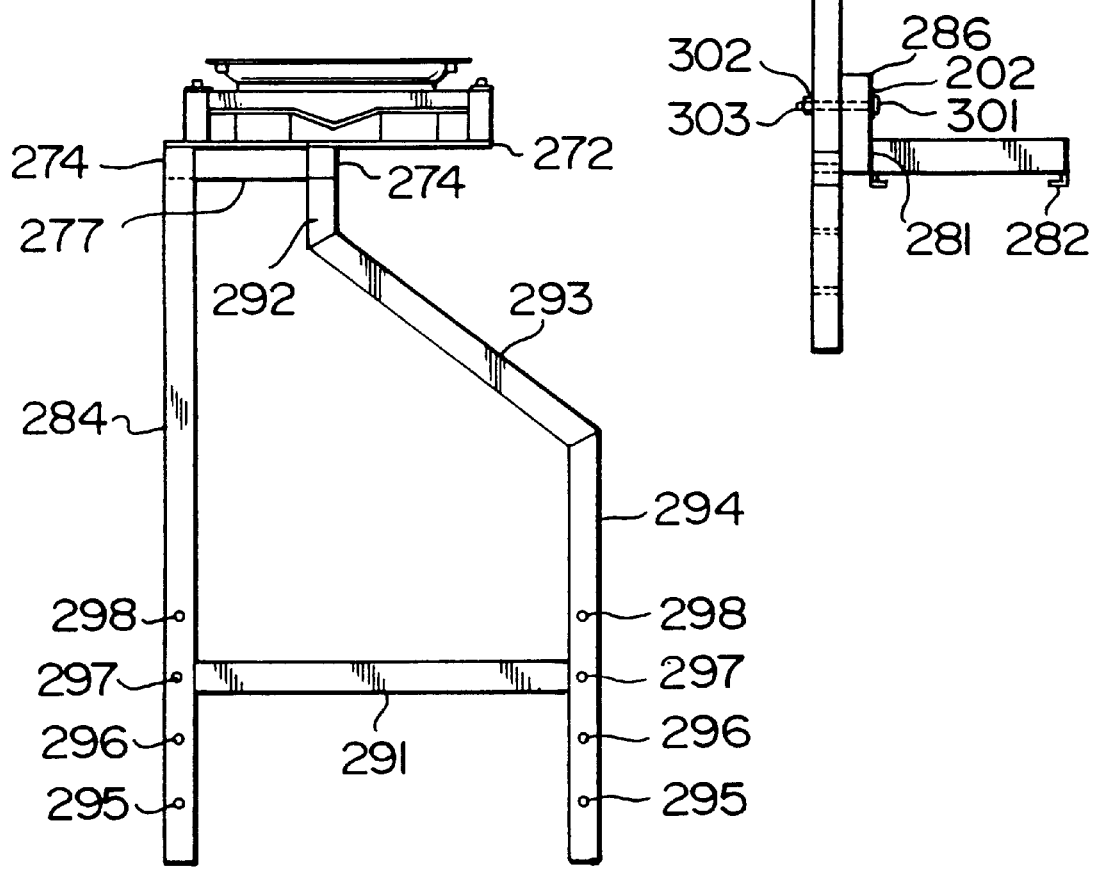
FIG. 25d illustrates a front view of the seat support.

Six ring flanges 167, 168 are used for coupling the central and outboard sections. Flanges 167, 168 are preferably constructed from Aluminum sheeting. Four small ring flanges 167 are constructed so as to have an outer diameter of 7.6 cm, in which a central hole 170 having 2.5 cm in diameter, and 3 connector holes 169, having 8 mm in diameter are drilled, in accordance with FIG. 18d. Two large ring flanges 168 are constructed so as to have an outer diameter of 9.2 cm, with a central hole 168, having 4.1 cm in diameter, and three connector holes 169. The large ring flanges 168 are respectively welded to the ends of the two lower longerons 125 and 159 on the inboard section (FIGS. 17a, b) and of the outboard section of the boom, so that the connector holes 169 are aligned, and so that the centre hole 170 is flush with the hollow interior the lower longerons. The small ring flanges 167 are then similarly welded to the ends of the upper longerons 127 and 161 on the inboard and outboard sections of the boom arm. The outboard section is easily fixed to the central section by screws, bolts and nuts through connector holes 169.

The counterweight assembly 171

The counterweight assembly portion 171 is illustrated in FIGS. 19a and 19b. The counterweight assembly is attached to the central section of the boom assembly and it is used for obtaining the actuating load point for moving vertically the boom assembly 11 with respect to the pivot point on the yoke shaft 117. The counterweight assembly comprises a connector section and a ballast box. The connector section includes a lower strut 173 and two upper struts 175. The struts are arranged to form the sides of a pyramid, one end of all struts being connected together by an end plate assembly 177 at actuating ends 182 and 178. The other end 183 and 179 of the upper struts 175 and the lower strut are adapted to be coupled to the ends of the lower and upper longerons of the central section, which protrude through connector holes 151 of the bulkhead 149.

The end plate assembly 177 is constructed to fix together by welding a bottom end plate to a top end plate. The bottom end plate is fashioned from a piece of Aluminum 2 mm thick, 7.6 cm long, and 5 cm wide, the top corner of which is cut off at a 22.5 degree angle to produce a polygonal structure. The top end plate is a pentagonal shaped structure having a long axis of 11.4 cm, a maximum width of 10.2 cm, a minimum width of 5 cm, and a thickness of 2 mm.

The upper struts 175 are constructed from aluminum tubing having a diameter of 2.5 cm and a length of 88.9 cm. A slot 2 mm in diameter is cut into end 182 of the struts, and that end is trimmed so that the upper strut may be slid securely onto the end plate 177 so that it contacts the end plate and the other strut. The lower strut 173 is preferably made from a piece of Aluminum tubing having a diameter of 4.1 cm and a length of 91 cm. Actuating end 178 is cut at a 31 degree angle, and the other end 179 is cut at a 22.5 degree angle. Slots 180 measuring 2 mm wide and 6.4 mm long are then cut into either end of the strut, as indicated in FIGS. 19a and 19b. A splice plate 181 is constructed from an Aluminum piece 2 mm thick, and 10.2 cm×10.2 cm square with the polygonal structure shown in FIG. 19a is inserted in slot 180 at end 179.

The upper struts 175 and lower strut 173 are then welded to the end plate 177, and the splice plate 181 is welded to the lower strut 173. Two attachment plugs 184, constructed from a solid aluminum rod 2.2 cm thick are placed into the hollow interior of the upper struts at end 183, and are welded into place. A connection hole 185, having a diameter of 6 mm is then milled through the attachment plug 184. This connection plug serves as a joint so that the struts of the counterweight portion may be attached to the longerons of the central portion.

The connector section is attached to the central section 121 to form the inboard portion of the boom assembly 11 by inserting the splice plate 181 into the slot 145 on the lower longeron, and welding the two together. The ends of the two upper longerons 127 are connected to the two upper struts 175 by running a bolt through the connection hole 185 in the connector plug 184 and then through the bushing 147 to which the plug 184 comes into contact, and fastening the bolt with a nut and a washer, so that all parts of the inboard portion are of the same electrical potential.

The ballast box 187 is preferably constructed from rectangular Aluminum tubing having a length of 7.6 cm and a width of 10.2 cm, that is 43.1 cm high. The bottom of the ballast box is cut at a 22.5 degree angle, and is welded to the end plate 177. The inside of the ballast box is then filled with molten lead, which is allowed to cool and solidify. Two counter ballast tubes (not shown) are then constructed from Aluminum tubing having a diameter of 4.1 cm, and a length of 25.4 cm. These are secured through the ballast box with bolts, washers and nuts. Lead shot will be added to these tubes when the boom is constructed and mounted on the yoke assembly so as to counterbalance the boom arm.

The control arm 85 is fashioned from a piece of Aluminum tubing that is bent into a gentle "U" shape, and is attached to the ballast box 187 and bulkhead 149, and is illustrated on FIG. 21. This control arm allows the operator of the boom to swing the boom both horizontally and vertically. The control arm 85 connects the middle of side 154 of the bulkhead 149 to the end 189 of ballast box 187. When arm 85 is pulled, the bulkhead pivots on shaft 117 and outboard end 12 is lifted, while when arm 85 is pushed, end 12 is lowered. By moving the arm to the right or left, this movement displaces the bulkhead and the shaft 117 of the yoke, so that the spindle yoke assembly rotates.

The boom stow assembly 22

The boom stow assembly 22, illustrated in FIGS. 20a–c, is designed to keep the boom securely stowed while the helicopter is in transit. Assembly 22 is constructed by joining a latch sub-assembly 191 to a boom stow stem 193, as shown in FIG. 20a.

An example of the latch sub-assembly 191 is shown in FIGS. 20b and 20c to comprise two "C" plates 194. Two 6 mm holes 195 and 196 are drilled in each piece. A spacer web 197 is manufactured from a piece of Aluminum measuring 2.8 cm in width and 63 cm in length. A slot 198 measuring 6 mm in width and 2.5 cm in length is then milled into the exact centre of the spacer web 197. The spacer web is then bent into a "C" shape so as to match the outer curve of the "C" plates 194. The spacer web is then welded to the two "C" plates to form the hollow structure shown in FIGS. 20b and c.

A latch arm 199 is manufactured according to the example illustrated on FIG. 20a, from a solid piece of Aluminum with a height of 19 mm, a width of 2.8 cm, and a length of 13 cm. The latch arm 199 is provided with an attachment hole 200 with a diameter of 6 mm. The hole 200 is necessary for attaching the latch arm of the latch subassembly 191 in hole 196, so that the latch arm 199 may swing freely when connected to the latch subassembly. One end of a torsion spring (not illustrated) is attached into hole 196 at the hollow space inside the latch subassembly by a hex headed bolt, a washer, and a self locking nut. The other end of the torsion spring is then connected to the latch hole 195 so that the spring is constantly pushing the latch arm 199 closed against the latch subassembly.

A cord attachment hole 201 with a diameter of 6 mm is drilled through the latch arm 199 for attaching a latch cord, which allows the operator to unlatch the boom assembly 11 from the boom stow assembly.

The boom stow stem 193 is preferably manufactured from a tubular aluminum pipe 203 having a diameter of 5 cm. from a length of pipe measuring 55.9 cm is cut. A second length of pipe 204 measuring 24.1 cm is then cut, and this length is cut in half along its longitudinal axis so as to form two semi-circular pieces of pipe 24.1 cm in length, which are then welded to one end of the first length 203 so as to stiffen it, forming a semi-stiffened stem assembly. A third length of pipe 205, measuring 20.3 cm is then cut, and is also cut along its long axis so as to form two semi-circular pieces of pipe 20.3 cm in length. These pieces are then welded to the semi-stiffened stem assembly as indicated in FIG. 20a, so that the weld between the first and second lengths 203 and 204 is offset by 90 degrees from the weld between the second and third lengths 204 and 205.

Saddle shells 207 are manufactured from two Aluminium piece 19/17 cm, which are rounded and form a cylindrical portion, for surrounding the port landing skid 3 of the helicopter, and two wings for securing the shells to each other.

The larger end 206 of the boom stow stem 193 is cut to fit onto the saddle shell 207, to which it is then welded to at a 20 degree angle, as indicated in FIG. 20a. The other end 208 of the stiffened stem assembly is cut at a 23 degree angle, and a notch is cut into the end so as to allow the latch sub-assembly to fit firmly into the stiffened stem assembly 193. The latch sub-assembly 191 is welded to the boom stow stem 193 so that it is at a 23 degree angle from the stem, and so that all parts are of the same electrical potential.

The nozzle control

A control lever system allows the operator to change the angle of the nozzle 16 at the end of the boom arm, allowing water to be sprayed at an angle into the interior of insulators, more effectively cleaning them.

The control lever system is shown in FIG. 21. The control lever system comprises a control lever 209, a nozzle control shaft 212 clamped to nozzle 16, a control tube 213 running between the lever 209 and shaft 214 and a path for directing the tube along the boom. The path comprises 5 control slides, each including a bushing 210 and a bushing block 211. Preferably, a bushing 210 is constructed from Aluminum tubing having an inner diameter of 13 mm and a length of 7.6 cm. A bushing block 210 having a diameter of 13 mm and a length of 7.6 cm is constructed from a solid nylon rod. A core having a diameter of 1 cm is milled out of the centre of the blocks. The blocks 211 are then inserted inside the bushings 210 so that the ends of the bushing blocks are flush with the bushings, creating a control slide. The control slides are then welded to one of the upper longerons 127 and 161 of the boom arm as shown in FIG. 21.

The nozzle control shaft 212 is clamped to the centre of the nozzle 16 at the end of the boom arm. The outboard part of the control tube 213 is constructed from aluminum tubing having a diameter of 9.5 mm and a length of 304.8 cm, and this is run through the bushing block 211 of the control slides attached on the outboard section 157. Two 6 degree bends are made by hand to the tube 213 at 25 cm from either side of the point where the tube 213 passes through the control slide to allow easy passage of the tube through the control slide. A 5 mm hole 214 is drilled in the end of the nozzle control shaft 212. The nozzle control shaft 212 is joined to the control tube 213 by a bolt, nut, and washer.

The inboard part of the control tube 213 is constructed from Aluminum tubing 9.5 mm in diameter and 365.8 cm in length, and a hole is drilled through the control tube at the onboard end. The control tube is positioned through the bushing blocks 211 of the four control slides on the inboard section 121 of the boom arm.

The control lever 209 is preferably constructed from Aluminum tubing 13 mm in diameter and 20.3 cm in length, and a 5 mm hole is drilled into one end. The control lever 209 is bolted to the end of the control tube 213 by running a bolt through the holes, through the lever and the control tube and securing the bolt with a nut and a washer. The control lever is then mounted to the ballast box 187 with a swivel clamp (not visible on FIG. 21) which allows the control handle to be freely pulled backwards and pushed forwards. When the control lever is moved in this fashion, the Aluminum tubing 213 moves freely through the core of the bushing blocks 211, pulling or pushing on the nozzle, and in this manner the effective angle that the water exits the boom arm can be controlled.

The power drive mount and the fluid circuit

The fluid circuit will be described in the following in further detail, reference being made to FIGS. 21 and 22. The fluid circuit comprises the pumping assembly 13 for driving the fluid to circulate from the fluid storage tank 216 to the nozzle 16, the first supply tubing 217 between the storage tank and the pumping assembly, a rigid tube 227, 229 inserted through the lower longerons 125 and 159 respectively, ending with the nozzle 16 at the outboard end 12 of the boom assembly 11, and a second supply tube 223, 225 for connecting the pump to the rigid tube.

The first supply tubing 217 is attached to a camlock fitting 235 located on the right hand side panel of the onboard tank 216, and this is connected to the suction connection side 219 of the pump. The second supply tubing 223 runs underneath the external work platform 1, and is attached between the discharge side 221 of the pump and a solenoid 237 that is bracketed onto the boom arm 11. A flexible hose 225 having 30.5 cm in length then connects the solenoid 237 to the rigid onboard water supply tube 227 that is constructed from Aluminum tubing 9.5 mm in diameter and 393.7 cm in length. This inboard tube 227 is inserted through the inside of the inboard lower longeron 125, and a gentle bend 228 is made at the end of the tube which exits onto the counterweight portion of the inboard section of the boom arm so that the tube 227 is flush with the lower strut 173, as illustrated in FIG. 21. The tube 227 is then connected to the hose 225.

The rigid outboard water supply tube 229 is constructed from Aluminum tubing 9.5 mm in diameter and 289.6 cm in length. This tube 229 is then inserted through the inside of the lower longeron 159. A 90 degree angle compression fitting made of brass is attached to the end of the tube, so that the fitting sticks out of the notch 165 in the end of the longeron 159. This compression fitting is then connected to a brass swivel, which is connected to a brass female 90 degree angle compression fitting, which is in turn connected to the brass nozzle 16 having a 9.5 mm in diameter and 20.3 cm in length.

The cleaning fluid delivery system is assembled by first inserting the rigid tubing in the outboard and inboard sections. The tubes are joined together by use of a tube connector 239. The outboard section 157 is then bolted to the inboard section 121 by joining the ring flanges of the outboard section flush to the ring flanges of the inboard section, and bolting them together by passing bolts through the holes in the ring flanges and securing them with washers and nuts. As a result, the entire boom arm should have the same electrical potential.

The pumping assembly 13 comprises a pump, a pump engine and a fuel tank for the pump engine (not shown). The fuel tank may be customer-made to have a diameter of 15.2 cm and a length of 30.5 cm. The fuel tank is secured to the power/drive mount 44 by a clamp.

The fluid storage tank 216 is preferably customer made, as illustrated in FIGS. 23a to 23d. The fluid storage tank is constructed from a sheet of Aluminum having a width of 68.6 cm and a length of 261.6 cm which is bent to form the perimeter of the tank namely the top, bottom, back and a front faces of the fluid tank. For example, a first bend at a 90 degree angle is made 79.4 cm from one end of the sheet to form bottom face 241, and a second bend is made at a 90 degree angle 61 cm from the first bend, so as to produce the back face 242. A final bend is made 61 cm from the second bend at an angle which allows the two ends of the sheet to touch, forming the top face 243 and the front face 244.

A right hand side panel 247 and left hand side panel 248 are constructed with a trapezoidal shape so as to form the left and right panels flush with the perimeter of the fuel tank. The fluid exits the tank through the camlock fitting 235. To this end, a hole with a diameter of 2.5 cm is drilled into the right side panel close to the sharp angle of the trapeze, and a nipple is then inserted into this hole and welded. The camlock fitting 235 is then screwed onto the nipple.

A large and a small supports 240, 245 are welded to the bottom 241 for supporting a false bottom 246. The first large support 240 is made from a "Z" bar measuring 66 cm in length and 8.9 cm in height, which is bent twice at a 90 degree angle along its short axis so as to produce two equal arms having a width of 19 mm connected by a central portion with a height of 2.5 cm. The second small support 245 measures 66 cm in length and 8.3 cm in height, and is then bent twice along its short axis so as equal arms having a width of 19 mm connected to a central portion with a height of 4.4 cm. The false bottom 246 is constructed from a sheet of Aluminum having a width of 68.6 cm and a length of 78.1 cm. A 90 degree angle bend is made 3.8 cm from the long end of this piece to produce a sheet measuring 74.3 cm in length and 68.6 cm in width with a 3.8 cm arm. This is then welded to the fuel tank and Z supports wherever it comes into contact with them.

The tank is supported on the helicopter floor by four angle anchors 249 which are "L" shaped pieces with a height of 2.5 cm, a width of 2.5 cm, and a length of 5 cm. A drill hole is made in each piece. The anchors 249 are welded to the left and right hand side panels as shown in FIG. 23b.

Four fittings 251 are then made in accordance with FIGS. 23c and d. The floor of the helicopter is made of ribbed sheet metal, and the fittings are slid overtop the ribs on the floor of the helicopter. The onboard fluid storage tank is positioned inside the helicopter on the fittings, which are aligned so that they are directly underneath the angle anchors 249. The fittings 251 are then attached to the floor of the helicopter by passing a bolt through the fitting and the floor of the helicopter, and then securing the bolt with a washer and nut. The fluid storage tank 216 is then secured to the fittings 251 by running structural steel screws through the anchor channel holes, and the fittings 251, and securing the screws with washers and nuts. Once this is done, the fluid tank 216 is of the same electrical potential as the helicopter.

The electrical controls

The controls of the invention are electrically powered from the 28V electrical system of the helicopter. This power flow is converted into a 12V flow by a converter, and is finally changed to a 120V flow by passing through an inverter. When a trigger fixed on the control arm 85 of the boom assembly 11 is depressed, electrical current flows from the inverter to the solenoid 237 illustrated in FIG. 22, causing it to open and thus allowing fluid to move into the fluid delivery system, and be directed onto the target.

The fluid delivery system may be shut down at any time by means of a parallel shutdown system consisting of two kill switches, one controlled by the pilot, and one controlled by the operator. When a kill switch is pressed, the flow of power to the system is cut. This causes an engine relay contact to open, stopping the pump engine from operating. Accordingly, the pump stops, and fluid ceases moving through the fluid delivery system.

The wing assembly

As mentioned above, the work platform may also be used for repairing the high voltage transmission lines. When in the repair mode, a wing is attached to the platform at the front of the port side, while the power drive mount is installed at the starboard side for counterbalancing the weight of the operator. The operator seats on the wing facing forward, with his legs dangling over the edge, and is secured with a seat belt assembly.

The wing assembly is illustrated in FIGS. 24a and 24b. The wing assembly 253 is constructed from 5 cm square Aluminum tubing. A forward beam 255 measuring 58.4 cm in length has one end cut at a 45 degree angle. An outside lateral beam 257 having a length of 91 cm has one end cut at a 45 degree angle, and this is welded to the forward beam to produce an "L" shape. Two stub tubes 259 measuring 53.3 cm in length are then cut from the Aluminum tubing. The wing is then positioned near the port edge intercostal 33 of work platform 1, and the stub tubes 259 are positioned so as to line up with the stub tube housing assemblies 261. The stub tubes are then welded to the "L" shape so produce an "E" shape that may be slid in and out of the stub tube housing assemblies 261. Lateral supports are then cut to span the distance between forward beam 255 and lateral supports, and these are welded into place. A sheet of Aluminum 263 having 91 cm in length and 45.7 cm wide is welded to the upper surface of the rectangular box, so that the entire wing assembly is of the same electrical potential. Two holes 264 having a diameter of 1.6 cm are then drilled through the central stub tube 259, and a hollow bushing 269 having a length of 6 cm is inserted into this hole and is welded into place. A seat belt assembly 265 is then attached to the bushings so as to allow a workman to be securely fastened to the wing assembly.

As shown in FIG. 24c, with the wing assembly 253 placed inside of the stub tube housing 261, a 6 mm hole 266 is drilled completely through the Aluminum mesh, stub tube housing 261 and stub tubes 259, so that when the wing is attached to the platform 1, it may be secured in place by dropping three pip pins 267 into the holes 266, locking the wing in place. A bonding strap made of braided steel having a width of 3 mm and a height of 6 mm is then attached between the wing assembly and the work platform so as to ensure that both are of the same electrical potential.

The seat assembly

As mentioned, for inspecting the high voltage transmission lines or the like, the helicopter flies besides and above the line having the inspector seated in a seat attached at the port side of the helicopter, locking closely at the lines.

The inspector's seat 19 is attached to the helicopter at the port rear cargo door area, as illustrated in FIGS. 25a to 25d, so as to allow the inspector to manoeuvre the boom while securely seated. The inspector's seat is attached to the aircraft by a seat adapter plate 272 constructed from a plate of Aluminum 28.6 cm long and 23 cm wide. The seat adapter plate is attached to a seat support 20 (see also FIGS. 1b, 2b and 3b) constructed from 19 mm×19 mm stainless steel tubing designed to act as a base for mounting the seat, a support the inspector's legs, and be its own method of attachment to the aircraft.

The seat support base 273 has a "C" shape and is fashioned from two lengths of tubing 274 connected by a piece of tubing 276. The lengths 274 are each 28.6 cm long, and have one end 275 cut at a 45 degree angle on the horizontal. Piece 276 has 12 cm in length, and both ends of this piece are cut at a 45 degree angle so that when this piece is inserted between the other two lengths 274, they fit together into a "C" shape 273 having a width of 12 cm and a length of 28.6 cm. These pieces are then welded together. A length of tubing 277 having a length of 8.3 cm is cut, and is inserted into the "C" shape 273 so that it is 7 cm from the open end of the "C" shape, and is welded into place. The two lengths 274 protruding past this piece 277 then have their ends trimmed at a 45 degree angle on the vertical.

Figure 1B:
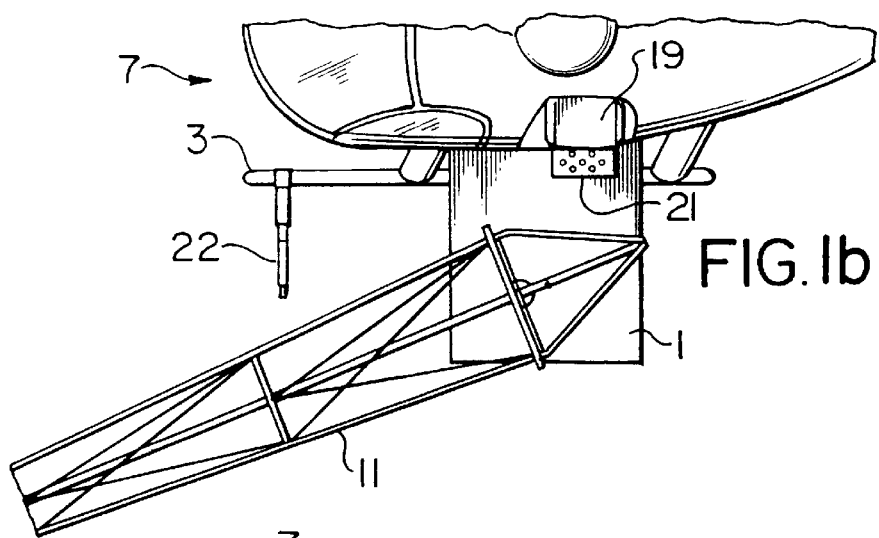
FIG. 1b is an top view of the portside door area of an helicopter, showing the inspector's seat.

The footrest plate 21 shown in FIGS. 26a to 26c and also in FIGS. 1b, 2b and 3b, supports the inspector's legs when he is seated on the seat. The footrest is manufactured from a stainless steel plate 3 mm thick 22.9 cm wide, and 33 cm long. This plate is bent along its length, 3.8 cm from either end, to produce a "C" shape consisting of a base 278 which is 15.2 cm wide and 33 cm long, with two arms 279 measuring 3.8 cm in width and 33 cm in length. Two notches 281 measuring 19 mm×19 mm are then cut from the base 278 of the "C" at either end of the same bend, so that one arm will be adjacent to two notches 281, while the other arm will be adjacent to none. Both arms 279 are then bent 9.5 mm from the ends so as to create two channels 282 that are 2.9 cm wide.

Two footrest support legs 283 are constructed from 19 mm×19 mm square stainless steel tubing.

For fixing the footrest plate 21 to seat support 271, a vertical support leg 284 is provided to the operator's right side and the forward part of the aircraft, and an angular support leg 285 is provided to the operator's left side and the rear part of the aircraft, from the operator's position, seated in his seat and looking out of the port side of the aircraft.

The footrest support legs 286 are each constructed from a 15.2 cm length of tubing that has one end cut at a 45 degree angle and is joined to a 5.5 cm length of tubing which also has one end cut at a 45 degree angle. These pieces are positioned so that when the cut ends are joined together they form an "L" shape, and these pieces are then welded together.

A hole 289 having 5 mm in diameter is drilled on each "L" for mounting the footrest 276 to the vertical support leg 284 and the Angular Support Leg 285.

Preferably, the vertical support leg 284 is constructed from a 46 cm length of tubing 284 that has one end cat at a 45 degree angle. The angular support leg 285 is constructed from three pieces of tubing, namely a 6.5 cm length of tubing 292 which has one end cut at a 45 degree angle and the other end cut at a 60 degree angle opposing at 90 degrees; a second length of tubing 293, which is 21.7 cm long and has both ends cut at a 60 degree angle; and a third piece 294 having 27.5 cm in length and having one end cut at a 60 degree angle. These pieces are assembled by joining the corresponding angles to form an "offset" of 28.3 cm and welding the joints.

An intercostal support 291 is constructed from 19 mm×19 mm square tubing 26.4 cm in length. This support 291 is placed between the vertical support leg 284 and the angular support leg 285 forming a "C" shape and allowing the support legs to extend beyond the intercostal support by 10.5 cm. These three pieces are then welded into position.

The vertical support leg 284 and the angular support leg 285 are welded to the open end of the seat support base 273 where the open end of the "C" shape made up of the two lengths 274 which protrude past piece 277. The matching 45 degree angles are placed to form a 90 degree angle and welded into position.

The footrest plate 278 is positioned channel side down, so the notches 281 are on the right hand side of the plate, towards the helicopter. The footrest support legs 286 are inserted one into each notch 281, so the long end of the leg fits inside the channel of the far arm. The footrest plate is then welded to footrest support legs.

Mounting holes 5 mm in diameter 295, 296, 297, and 298 are drilled on the vertical and angular support legs 284 and 285. These holes are drilled through center beginning at the bottom of each leg at 3.5 cm spaced vertically a 3.75 cm center to center.

The footrest assembly is then bolted to the vertical and angular support legs matching holes 289 to the holes 295, 296, 297, or 298, as required to accommodate the operator's height by two structured steel screws 301, washers 302, and nuts 303. The seat adapter plate is also bolted to the seat assembly base by four structural steel screws 304, washers 305, and nuts 306.

A Pin 311 is manufactured from a stainless steel rod having a diameter of 17 mm, and a length of 7 cm. This is welded to the vertical support Leg 284 so the centre of the pin 311 is 5.7 cm from the seat support base 273. A hole 312 5 mm in diameter is drilled vertically through the pin 6 mm from its end. The completed seat assembly may now be attached to the helicopter. The pin is designed to be inserted into a pre existing hole on the helicopter that is a fixed point for the attachment of a step. The pin is kept in position by dropping a step pin 313 through the base plate, through a pre-existing hole in the floor of the helicopter, and through the hole 312 in the pin.

Best Mode For Carrying out the Invention

The Invention would be best used by first attaching the seat assembly to the aircraft and performing a detailed line inspection of the high voltage transmission lines to determine the necessity of either cleaning or maintenance. A line inspection is generally done by having the pilot fly beside and above the high voltage transmission line, and having the inspector on the seat on the port side of the aircraft look at the lines.

After the operator has viewed the high voltage transmission lines, a determination will be made as to whether the lines require maintenance, cleaning, or both. If the transmission lines require either maintenance or cleaning, then the external work platform will be attached to the skids of the helicopter. It is most convenient to leave the boom stow and saddle legs of the invention permanently mounted to the helicopter. The platform can then be either attached or removed from the helicopter by running bolts through the assembly and slide/guide attachments.

When the external work platform is used in its repair platform mode, then the external wing may be added by attaching the stubs of the wing into the stub tubes, and affixing them in place with the pip pins. The power drive mount is then attached to the starboard side of the Helicopter to counterbalance the weight of the inspector. The power drive mount is attached by aligned the pre-existing bolt holes on the power drive mount and shear panel, and then passing four bolts through these holes, and securing the bolts with washers and nuts. The workman sits facing forward on the external wing, with his legs dangling over the edge, and is secured in place with a seat belt assembly. In this manner the workman can be positioned very close to the transmission line so as to use the barehand method for repairing the high voltage transmission lines.

When the work platform is used in its hydro service system mode, the work platform is attached to the starboard side of the aircraft by bolting it to the four bolt holes on the shear panel, and connecting the pump to the onboard fluid tank. The fluid tank is filled with cleaning fluid, which in most circumstances will be water. The spindle yoke assembly is then dropped into the swivel hole on the port side of the external work platform so that the spindle yoke assembly comes into contact with the stop ring. The boom arm is then mounted on the spindle yoke assembly. Bonding straps are attached between the platform and spindle yoke assembly, spindle yoke assembly and boom, and external work platform and helicopter to ensure that all parts of the invention are of the same electrical potential. At this point the helicopter should be counterbalanced. A hose is connected from the onboard fluid tank to the solenoid. The boom arm is then latched into the boom stow for transport.

The helicopter then flies to the work site, and hovers near the high voltage transmission lines. The operator of the boom, who is seated on the inspector's seat and secured to the helicopter with a security line, then unlatches the boom from the boom stow by using the latch cord. He is then able to swing the boom out and control its motion both vertically and horizontally by use of the control arm on the boom stow, as well as control the angle of the nozzle by use of the control lever. When he has positioned the boom at the correct angle, he then depresses the trigger on the control arm, which opens the solenoid allowing water to be pumped through the hose located inside the lower longeron of the boom arm, to the point where it exits the nozzle, and is directed at the insulator which is cleaned by the force of the water striking it.

It is claimed:

1. A multipurpose repair and maintenance apparatus for aerial inspection, repair and controllable delivery of a stream of cleaning fluid to a workpiece for cleaning, comprising:

a work platform defining a starboard side and a port side;

a boom assembly extending from said work platform, said boom assembly defining an onboard end and an outboard end;

support means provided on said port side of said work platform for rotatably receiving said boom assembly on said work platform;

a fluid circuit with pumping means for pumping cleaning fluid through a fluid circuit from a fluid storage tank to a nozzle output located at said outboard end of said boom assembly;

power drive mounting means provided on said starboard side of said work platform for detachably fixing said pumping means on said work platform; and means for removably fixing said work platform to a starboard skid and a port skid of a helicopter such that the loads on said work platform are fully of balanced, wherein said work platform is made of electrically conductive material and all electrically conductive parts of said boom assembly, said power drive mounting means, said pumping means, said fluid circuit and said means for removably fixing are electrically connected to said work platform and to the electrically conductive parts of the helicopter to have the same electrical potential.

2. An apparatus as claimed in claim 1, further comprising a seat and means for securing said seat to a rear port cargo door area of the helicopter.

3. An apparatus as claimed in claim 1, wherein said work platform is 366 cm long, said starboard side extending 142 cm from the starboard landing skid and said port side extending 112 cm from said port side skid.

4. An apparatus as claimed in claim 1, further comprising boom actuating means at said onboard end of said boom assembly, for controlling the vertical and horizontal movement of said outboard end of said boom assembly.

5. An apparatus as claimed in claim 4, wherein said boom assembly comprises:

a boom including three longerons arranged to define a rigid fusto-pyramidal structure reinforced with a plurality of reinforcing stays, for transmitting the motion of said onboard end to said outboard end; and a triangular bulkhead at said onboard end of said boom for holding the ends of said longerons, one of said longerons accommodating a rigid tube for conducting the cleaning fluid from said onboard end to said outboard end of said boom assembly.

6. An apparatus as claimed in claim 5, wherein each of said longerons comprises an onboard segment and an outboard segment and means for detachably coupling said onboard segment to said outboard segment.

7. An apparatus as claimed in claim 5, further comprising a counterweight assembly comprising:

three bars joined at a common end, each bar being connected with a free end to an onboard end of a respective longeron; and a ballast box joined to said common end for counterbalancing the weight of said boom assembly.

8. An apparatus as claimed in claim 4, wherein said boom actuating means comprises:
   a spindle for cooperation with said support means, said spindle enabling rotation of said onboard end of said boom assembly in a horizontal plane;
   a yoke including a base fixed on said spindle for rotation therewith, two diverging support arms and a shaft between said support arms, said shaft being coupled with said bulkhead for enabling rotation of said onboard end in a vertical plane; and
   a control arm for driving the vertical and horizontal rotation of said yoke.

9. An apparatus as claimed in claim 1 further comprising nozzle control means for adjusting the angle of said nozzle output.

10. An apparatus as claimed in claim 9, wherein said nozzle control means comprises:
   a nozzle control shaft clamped to said nozzle output;
   a control handle at said onboard end of said boom assembly for driving said nozzle control shaft; and
   a control tube guided along said boom assembly, said control tube being fixed to said nozzle control shaft at one end and to said control handle at the other end.

11. An apparatus as claimed in claim 1, wherein said cleaning fluid circuit further comprises:
   supply tubing between said storage tank and said pumping means;
   a rigid tube inserted through a longeron of said boom assembly between said onboard end and said outboard end of said boom assembly;
   a nozzle at said nozzle output, said nozzle being provided on a portion of said rigid tube extending through said longeron at said outboard end forming said nozzle output; and
   a flexible hose connecting said pumping means to said rigid tube.

12. An apparatus as claimed in claim 1, further comprising:
   a spindle-yoke assembly at said onboard end of said boom assembly coupled with said bulkhead for allowing said onboard end of said boom assembly to rotate in a horizontal and a vertical plane; and
   a control arm for driving the vertical and horizontal rotation of said spindle-yoke assembly.

13. An apparatus as claimed in claim 1, said support means further comprising means for restricting the rotation of said boom in the horizontal plane to a predetermined sector.

14. An apparatus as claimed in claim 1, wherein said means for removably fixing said work platform comprises saddle legs for mounting on the landing skids of an helicopter and means for attaching said work platform to said saddle legs.

15. An apparatus as claimed in claim 1, further including a boom stow assembly for keeping said boom assembly securely stowed while the helicopter is in transit.

16. An apparatus as claimed in claim 15, wherein said boom stow assembly comprises a latch subassembly and a boom stow stem on the port skid of the helicopter.

17. A multipurpose repair and maintenance apparatus for aerial inspection, repair and controllable delivery of a stream of cleaning fluid to a workpiece for cleaning, comprising:
   a work platform defining a starboard side and a port side, for attachment on a helicopter skids;
   an external wing for supporting a person;
   means for attaching said external wing to said port side of said work platform;
   power drive mounting means provided at said starboard side for balancing the weight of a workman when seated on said wing; and
   means for removably fixing said work platform to the skids of the helicopter such that the loads on said work platform are balanced.

18. An apparatus as claimed in claim 17, wherein said work platform is made of electrically conductive material and all the electrically conductive parts of said external wing, said means for attaching, power drive mounting means and means for removably fixing are connected to the electrically conductive parts of the helicopter to have the same electrical potential.

19. A multipurpose repair and maintenance apparatus for aerial inspection, repair and controllable delivery of a stream of cleaning fluid to a workpiece for cleaning, comprising:
   saddle legs for mounting on the landing skids of an helicopter;
   a work platform defining a starboard side and a port side, comprising means for removable attachment on said saddle legs;
   a boom assembly extending from said work platform and defining a onboard end and an outboard end;
   support means provided on said port side of said work platform for rotatably receiving said boom assembly on said work platform;
   a spindle for cooperation with said support means for enabling rotation of said onboard end of said boom assembly in a horizontal plane;
   a yoke including a base fixed on said spindle for rotation therewith, two diverging support arms and a shaft between said support arms, said shaft being coupled with said onboard end of said boom assembly for enabling rotation of said onboard end in a vertical plane; and
   a control arm for driving the vertical and horizontal rotation of said yoke;
   a fluid circuit with pumping means for pumping cleaning fluid through a fluid circuit from a fluid storage tank to a nozzle output located at said outboard end of said boom assembly;
   nozzle control means for adjusting the angle of said nozzle output; and
   power drive mounting means provided on said starboard side of said work platform for detachably fixing said pumping means on said work platform, such that the loads on said work platform are fully balanced.

20. A work platform for attachment to saddle legs provided on landing skids of an helicopter comprising:
   a metal support defining a top and a back face and a starboard side and a port side;
   a shear panel fixed on said top face at said starboard side of said metal support;
   a power drive mount detachably fixed on said sheer panel;
   a support box provided with a bearing flange assembly fixed on said metal support at said port side for rotatably receiving a spindle; and
   slide-guide attachments that mount said work platform on said saddle legs, said slide-guide attachments provided on the back face of said metal support placed such as to obtain equal distribution of the loads on said work platform when attached to the helicopter landing skids.

21. A work platform as claimed in claim 20, wherein said slide-guide attachments enable fine displacement of the work platform when mounted on said saddle legs, for fine adjustment of the position of said work platform on the helicopter skids.

22. A work platform as claimed in claim 20 further comprising a boom assembly adapted for removable attachment to the work platform for controllable delivery of a stream of cleaning fluid to a workpiece for cleaning, comprising:

a boom including three longerons extending between said onboard end and said outboard end of said boom assembly, said longerons being arranged to define a rigid fusto-pyramidal structure reinforced with a plurality of stays, for transmitting the motion of said onboard end to said outboard end; and a triangular bulkhead at said onboard end of said boom for holding the ends of said longerons, one of said longerons accommodating a rigid tube for conducting a fluid from said onboard end to said outboard end of said boom assembly.

23. A system as claimed in claim 22, wherein each of said longerons comprises an onboard segment detachably coupled to an outboard segment.

24. An apparatus as claimed in claim 22, further comprising a counterweight assembly including:

three bars joined at a common end, each bar being connected with a free end to an onboard end of a respective longeron; and a ballast box joined to said common end for balancing the weight of said boom.

25. A multipurpose repair and maintenance apparatus for aerial inspection, repair and controllable delivery of a stream of cleaning fluid to a workpiece for cleaning, comprising:

saddle legs for mounting on the landing skids of an helicopter;

a metal support defining a top and a back face and a starboard side and a port side;

a shear panel fixed on said top face at said starboard side of said metal support;

slide-guide attachments provided on the back face of said metal support and placed such as to obtain equal distribution of the loads on said work platform when attached to the helicopter landing skids;

a boom assembly extending from said work platform and defining a onboard end and an outboard end;

support means provided on said port side of said work platform for rotatably receiving said boom assembly on said work platform;

boom actuating means provided at said onboard end for controlling the vertical and horizontal movement of said outboard end of said boom assembly;

a fluid circuit with pumping means for pumping cleaning fluid through a fluid circuit from a fluid storage tank to a nozzle output located at said outboard end of said boom assembly;

nozzle control means for adjusting the angle of said nozzle output; and power drive mounting means fixed on said shear panel at said starboard side of said work platform for receiving said pumping means on said work platform, such that the loads on said work platform are fully balanced.

26. A multipurpose repair and maintenance apparatus for aerial inspection, repair and controllable delivery of a stream of cleaning fluid to a workpiece for cleaning, comprising:

a work platform defining a starboard side and a port side;

a boom assembly extending from said work platform, said boom assembly defining an onboard end and an outboard end;

a support box provided on said port side of said work platform and rotatably receiving said boom assembly on said work platform;

a fluid circuit with a pumping assembly that pumps cleaning fluid through a fluid circuit from a fluid storage tank to a nozzle output located at said outboard end of said boom assembly;

a power drive mount provided on said starboard side of said work platform and detachably fixing said pumping assembly on said work platform; and saddle assemblies that removably fix said work platform to a starboard skid and a port skid of a helicopter such that the loads on said work platform are fully balanced, wherein said work platform is made of electrically conductive material and all electrically conductive parts of said boom assembly, said power drive mount, said pumping assembly, said fluid circuit and said saddle assemblies are electrically connected to said work platform and to the electrically conductive parts of the helicopter to have the same electrical potential.

27. An apparatus as claimed in claim 26, further comprising a seat and a seat adaptor plate that secures said seat to the rear port cargo door area of the helicopter.

28. An apparatus as claimed in claim 26, wherein said work platform is 366 cm long, said starboard side extends 142 cm from the starboard landing skid and said port side extends 112 cm from said port side skid.

29. An apparatus as claimed in claim 26, further comprising a boom actuator at said onboard end of said boom assembly that controls the vertical and horizontal movement of said outboard end of said boom assembly.

30. An apparatus as claimed in claim 29, wherein said boom assembly comprises:

a boom including three longerons arranged to define a rigid fusto-pyramidal structure reinforced with a plurality of reinforcing stays that transmits the motion of said onboard end to said outboard end; and a triangular bulkhead at said onboard end of said boom for holding the ends of said longerons, one of said longerons accommodating a rigid tube that conducts the cleaning fluid from said onboard end to said outboard end of said boom assembly.

31. An apparatus as claimed in claim 30, wherein each of said longerons comprises an onboard segment detachably coupled to an outboard segment.

32. An apparatus as claimed in claim 30, further comprising a counterweight assembly comprising:

three bars joined at a common end, each bar being connected with a free end to an onboard end of a respective longeron; and a ballast box joined to said common end that counterbalances the weight of said boom assembly.

33. An apparatus as claimed in claim 29, wherein said boom actuator comprises:

a spindle for cooperation with said support box, said spindle enabling rotation of said onboard end of said boom assembly in a horizontal plane;

a yoke including a base fixed on said spindle for rotation therewith, two diverging support arms and a shaft between said support arms, said shaft being coupled with said bulkhead to enable rotation of said onboard end in a vertical plane; and a control arm that drives the vertical and horizontal rotation of said yoke.

34. An apparatus as claimed in claim 26, further comprising a control lever system that adjusts the angle of said nozzle output.

35. An apparatus as claimed in claim 34, wherein said control lever system comprises:
   a nozzle control shaft clamped to said nozzle output;
   a control handle at said onboard end of said boom assembly that drives said nozzle control shaft; and
   a control tube guided along said boom assembly, said control tube being fixed to said nozzle control shaft at one end and to said control handle at the other end.

36. An apparatus as claimed in claim 26, wherein said cleaning fluid circuit further comprises:
   supply tubing between said storage tank and said pumping assembly;
   a rigid tube inserted through a longeron of said boom assembly between said onboard end and said outboard end of said boom assembly;
   a nozzle at said nozzle output, said nozzle being provided on a portion of said rigid tube extending through said longeron at said onboard end forming said nozzle output; and
   a flexible hose that connects said pumping assembly to said rigid tube.

37. An apparatus as claimed in claim 26, further comprising:
   a spindle-yoke assembly at said onboard end of said boom assembly coupled with said bulkhead that allows said onboard end of said boom assembly to rotate in a horizontal and a vertical plane; and
   a control arm that drives the vertical and horizontal rotation of said spindle-yoke assembly.

38. An apparatus as claimed in claim 26, wherein the rotation of said boom in the horizontal plane is restricted to a predetermined sector.

39. An apparatus as claimed in claim 26, wherein said saddle assemblies comprise saddle legs that mount on the landing skids of an helicopter, and said work platform is attachable to said saddle legs.

40. An apparatus as claimed in claim 26, further including a boom stow assembly that keeps said boom assembly securely stowed while the helicopter is in transit.

41. An apparatus as claimed in claim 40, wherein said boom stow assembly comprises a latch subassembly and a boom stow stem on the port skid of the helicopter.

42. A multipurpose repair and maintenance apparatus for aerial inspection, repair and controllable delivery of a stream of cleaning fluid to a workpiece for cleaning, comprising:
   a work platform attachable to helicopter skids, the work platform defining a starboard side and a port side;
   an external wing for supporting a person, said external wing being attachable to said port side of said work platform;
   a power drive mount provided at said starboard side that balances the weight of a workman when seated on said wing; and
   saddle assemblies that removably fix said work platform to the skids of the helicopter such that the loads on said work platform are balanced.

43. An apparatus as claimed in claim 42, wherein said work platform is made of electrically conductive material and all the electrically conductive parts of said external wing, said power drive mount and said saddle assemblies are connected to the electrically conductive parts of the helicopter to have the same electrical potential.

44. A multipurpose repair and maintenance apparatus for aerial inspection, repair and controllable delivery of a stream of cleaning fluid to a workpiece for cleaning, comprising:
   saddle legs that mount on the landing skids of an helicopter;
   a work platform defining a starboard side and a port side, the work platform being removably attachable on said saddle legs;
   a boom assembly extending from said work platform and defining a onboard end and an outboard end;
   a support box provided on said port side of said work platform to rotatably receive said boom assembly on said work platform;
   a spindle that cooperates with said support box to enable rotation of said onboard end of said boom assembly in a horizontal plane;
   a yoke including a base fixed on said spindle for rotation therewith, two diverging support arms and a shaft between said support arms, said shaft being coupled with said onboard end of said boom assembly to enable rotation of said onboard end in a vertical plane; and
   a control arm for driving the vertical and horizontal rotation of said yoke;
   a fluid circuit with a pumping assembly that pumps cleaning fluid through a fluid circuit from a fluid storage tank to a nozzle output located at said outboard end of said boom assembly;
   a control lever system that adjusts the angle of said nozzle output; and
   a power drive mount provided on said starboard side of said work platform and detachably fixing said pump on said work platform, such that the loads on said work platform are fully balanced.

45. A multipurpose repair and maintenance apparatus for aerial inspection, repair and controllable delivery of a stream of cleaning fluid to a workpiece for cleaning, comprising:
   saddle legs that mount on the landing skids of an helicopter;
   a metal support defining a top and a back face and a starboard side and a port side;
   a shear panel fixed on said top face at said starboard side of said metal support;
   slide-guide attachments provided on the back face of said metal support and placed such as to obtain equal distribution of the loads on said work platform when attached to the helicopter landing skids;
   a boom assembly extending from said work platform and defining a onboard end and an outboard end;
   a support box provided on said port side of said work platform and rotatably receiving said boom assembly on said work platform;
   a boom actuator provided at said onboard end that controls the vertical and horizontal movement of said outboard end of said boom assembly;
   a fluid circuit with a pumping assembly that pumps cleaning fluid through a fluid circuit from a fluid storage tank to a nozzle output located at said outboard end of said boom assembly;
   a control lever system that adjusts the angle of said nozzle output; and
   a power drive mount fixed on said shear panel at said starboard side of said work platform and receiving said pumping assembly on said work platform, such that the loads on said work platform are fully balanced.

* * * * *